(12) United States Patent
Poezart et al.

(10) Patent No.: US 11,275,704 B2
(45) Date of Patent: Mar. 15, 2022

(54) METHOD AND SYSTEM FOR COMMUNICATING OVER A BUS

(71) Applicant: Melexis Technologies SA, Bevaix (CH)

(72) Inventors: Mathieu Poezart, Saint-Aubin-Sauges (CH); Zsombor Lazar, Murten (CH); Antonius Duisters, Tafers (CH)

(73) Assignee: MELEXIS TECHNOLOGIES SA, Bevaix (CH)

( * ) Notice: Subject to any disclaimer, the term of this patent is extended or adjusted under 35 U.S.C. 154(b) by 77 days.

(21) Appl. No.: 16/584,105

(22) Filed: Sep. 26, 2019

(65) Prior Publication Data
US 2020/0104270 A1 Apr. 2, 2020

(30) Foreign Application Priority Data
Sep. 27, 2018 (EP) ..................................... 18197381

(51) Int. Cl.
*G06F 13/36* (2006.01)
*G06F 13/362* (2006.01)
(Continued)

(52) U.S. Cl.
CPC .......... *G06F 13/362* (2013.01); *G06F 13/387* (2013.01); *G06F 13/4009* (2013.01); *H04L 12/4135* (2013.01)

(58) Field of Classification Search
CPC ....................................................... H04L 12/40
See application file for complete search history.

(56) References Cited

U.S. PATENT DOCUMENTS 4,373,183 A * 2/1983 Means .................. G06F 13/374
370/462
6,012,111 A * 1/2000 Gulick ................ G06F 13/4027
710/62
(Continued)

FOREIGN PATENT DOCUMENTS

EP 1050998 * 5/1999 ............ H04L 12/40
EP 1050998 A1 11/2000
(Continued)

OTHER PUBLICATIONS

Gal Ashour, USB Device Class Definition for Audio Data Formats, IBM Corporation Mar. 18, 1998.*
(Continued)

*Primary Examiner* — Henry Tsai
*Assistant Examiner* — Kim T Huynh
(74) *Attorney, Agent, or Firm* — Workman Nydegger

(57) ABSTRACT

A communication system comprising: a digital serial bus, and a master device and at least one slave device connected to the bus. The master and the slave(s) are adapted to communicate according to a predefined communication protocol. The master is adapted for transmitting a continuous bitstream in the form of a plurality of frames, such that each frame comprises one or more words. Each word has a constant time duration, with the first word of each frame being a unique word transmitted by the master for indicating the start of a frame. One or more bits each word is transmitted by the master as a dominant bit; a non-dominant bit, for allowing the at least one slave to overwrite. The at least one slave is adapted for overwriting in the continuous bitstream some non-dominant bits to transmit data in a quasi-synchronous manner.

18 Claims, 24 Drawing Sheets

(51) Int. Cl.
*G06F 13/38* (2006.01)
*G06F 13/40* (2006.01)
*H04L 12/413* (2006.01)

(56) References Cited

U.S. PATENT DOCUMENTS

| | | | | |
|---|---|---|---|---|
| 7,610,135 | B2* | 10/2009 | Miura | G07C 5/008 |
| | | | | 280/735 |
| 2003/0070019 | A1* | 4/2003 | Dalakuras | H04L 12/40156 |
| | | | | 710/110 |
| 2006/0197717 | A1* | 9/2006 | Huyn | H04L 12/403 |
| | | | | 345/13 |
| 2006/0256875 | A1* | 11/2006 | McClellan | H04J 3/1617 |
| | | | | 375/242 |
| 2006/0268997 | A1* | 11/2006 | Thaler | H03M 5/145 |
| | | | | 375/242 |
| 2009/0147763 | A1* | 6/2009 | Desai | H04B 1/40 |
| | | | | 370/343 |
| 2011/0038388 | A1* | 2/2011 | Hartwich | G06F 1/12 |
| | | | | 370/503 |
| 2012/0030388 | A1 | 2/2012 | Bas et al. | |
| 2014/0047282 | A1* | 2/2014 | Deb | G06F 11/079 |
| | | | | 714/48 |
| 2014/0059267 | A1* | 2/2014 | Lai | G06F 13/4059 |
| | | | | 710/313 |
| 2014/0156893 | A1* | 6/2014 | Monroe | G06F 13/3625 |
| | | | | 710/117 |
| 2015/0003443 | A1* | 1/2015 | Koenigseder | H04L 12/4625 |
| | | | | 370/350 |
| 2016/0094312 | A1* | 3/2016 | Fredriksson | H04L 1/0061 |
| | | | | 714/807 |
| 2016/0359893 | A1* | 12/2016 | Kishikawa | H04L 67/12 |
| 2016/0363638 | A1* | 12/2016 | Daubert | G01R 33/075 |
| 2016/0373449 | A1* | 12/2016 | Haga | H04W 4/46 |
| 2017/0147812 | A1* | 5/2017 | Ujiie | H04L 12/28 |
| 2017/0163366 | A1* | 6/2017 | Aichriedler | H04L 12/403 |
| 2020/0104270 | A1* | 4/2020 | Poezart | G06F 13/387 |

FOREIGN PATENT DOCUMENTS

| | | | | |
|---|---|---|---|---|
| EP | 2439885 | A1 | 4/2012 | |
| EP | 2439885 | * | 11/2012 | H04L 12/403 |
| EP | 3517897 | A1 | 7/2019 | |
| EP | 3629525 | A1 * | 4/2020 | G06F 13/387 |

OTHER PUBLICATIONS

European Search Report from EP Application No. EP 18197381, dated Mar. 7, 2019.

* cited by examiner

FRAME = 1 or more words, (N=1 or 2 or ... or 9 or ... 13 or ...)

SOF = start of frame = 0xFC or 0xF8 or ...
  first bit of SOF = '0'
[w1+w2] = message from first sensor
  first bit of each word = '1'
[w3+w4+w5] = message from second sensor
  first bit of each word = '1'

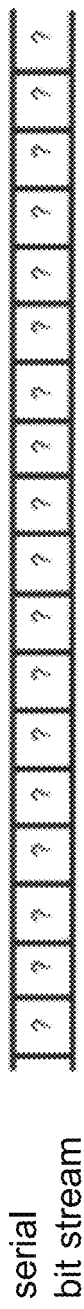
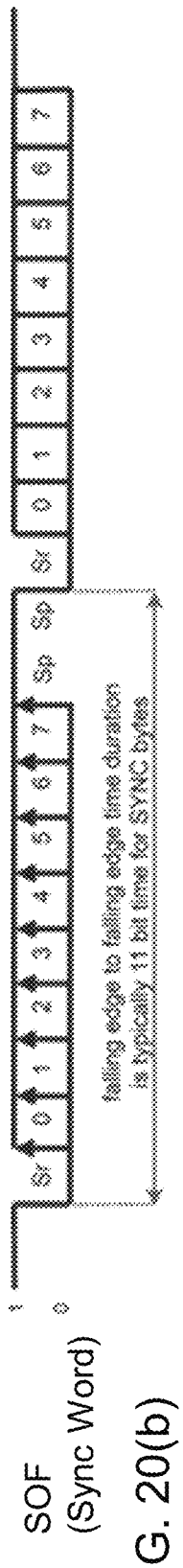
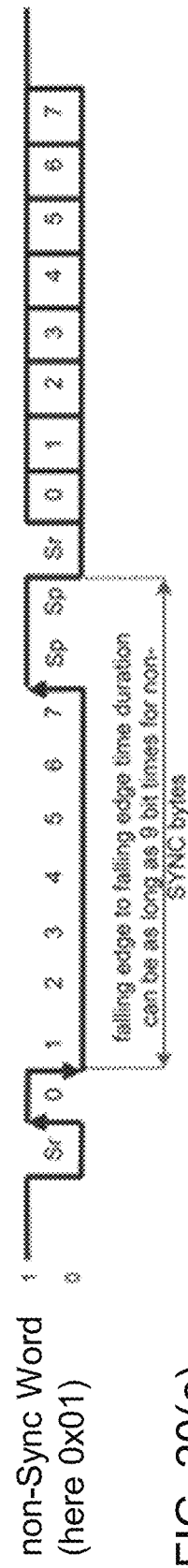
FIG. 20(a) serial bit stream
FIG. 20(b) SOF (Sync Word)
FIG. 20(c) non-Sync Word (here 0x01)

SOF = start of frame = 0xFC or 0xF8 or ...
    first bit of SOF = '0'
[w1+w2] = message from first sensor
    first bit of each word = '1'
[w3+w4+w5] = message from second sensor
    first bit of each word = '1'

FIG. 27

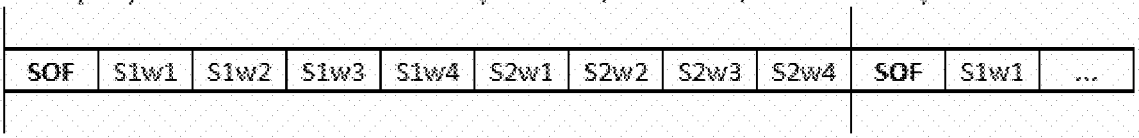

SOF = start of frame = 0xFC or 0xF8 or ...
    first bit of SOF = '0'
[S1w1..S1w4] = message from first slave (net 7x4=28 bits)
    first bit of each word = '1'
[S2w1..S2w4] = message from second slave (net 7x4=28 bits)
    first bit of each word = '1'

FIG. 28

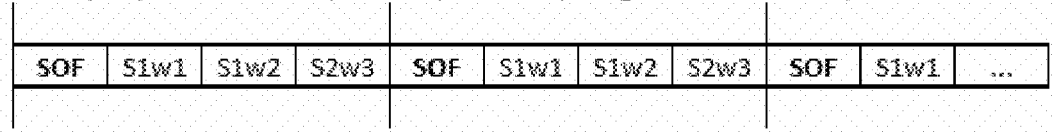

SOF = start of frame = 0xFC or 0xF8 or ...
    first bit of SOF = '0'
[S1w1..S1w3] = message from slave (net 7x3=21 bits)
    first bit of each word = '1'

FIG. 29

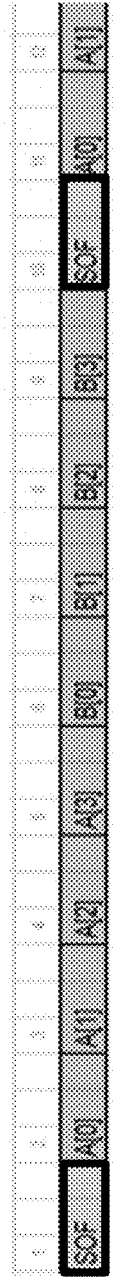
FIG. 30 — Exemplary frame format, dual sensor, 9 words/frame
FIG. 31 — Example 1: 12 bit output, with 1 bit Sensor ID, with 2 bit rolling counter, 5 bit CRC
- Answer Size: 3 (words/frame)
- Channel: 1
- Channel resolution (bit): 12
- Status/error (bit): 1
- Slave ID (bit): 1
- CRC (bit): 5
- Rolling Counter (bit): 2
- Serial messages: no Example 3: 12 bit output, with 2 bit Sensor ID, serial message 32*4b, with 2 bit rolling counter, 5 bit CRC, which do NOT contain a dominant 0x00 byte

| Byte Name | Word 0 | | | | | | | | Word 1 | | | | | | | | Word 2 | | | | | | | | Word 3 | | | | | | | |
|---|---|---|---|---|---|---|---|---|---|---|---|---|---|---|---|---|---|---|---|---|---|---|---|---|---|---|---|---|---|---|---|---|
| Bit Index | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 |
| Field Name | SOW | channel[1] | channel[2] | channel[3] | channel[4] | channel[5] | channel[6] | status | SOW | channel[6] | channel[7] | channel[8] | channel[9] | channel[10] | channel[11] | sensorID[0] | SOW | serialmsg[0] | serialmsg[1] | serialmsg[2] | serialmsg[3] | serial[2] | serial[3] | serial[4] | SOW | RollCnt[0]* | RollCnt[1]* | crc[0] | crc[1] | crc[2] | crc[3] | crc[4] |

* serialID[0] and [1]

- Answer Size: 4 (words/frame)
- Channel : 1
- Channel resolution (bit) : 12
- Status/error (bit) : 1
- Slave ID (bit) : 1
- CRC (bit) : 5
- Rolling Counter (bit) : 2
- Serial messages 4 * 8 *4 (bit) = 128

FIG. 32

Example 2: 2x12 bit output, with 3 bit Sensor ID, with 2 bit rolling counter, 5 bit CRC

| Byte Name | Word 0 | | | | | | | | Word 1 | | | | | | | | Word 2 | | | | | | | | Word 3 | | | | | | | | Word 4 | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|
| Bit Index | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 |
| Field Name | SOM | channel[1] | channel[2] | channel[3] | channel[4] | channel[5] | channel[6] | status | SOM | channel[7] | channel[8] | channel[9] | channel[10] | channel[11] | sensor 0 | | SOM | channel[0] | channel[1] | channel[2] | channel[3] | channel[4] | channel[5] | channel[6] | sensor 1 | | SOM | channel[7] | channel[8] | channel[9] | channel[10] | channel[11] | sensor 2 | | SOM | RollCnt[0] | RollCnt[1] | CRC[0] | CRC[1] | CRC[2] | CRC[3] | CRC[4] |

- Answer Size: 5 (words/frame)
- Channel : 2
- Channel resolution (bit) : 12
- Status/error (bit) : 1
- Slave ID (bit) : 3
- CRC (bit) : 5
- Rolling Counter (bit) : 2
- Serial messages : no

FIG. 33

METHOD AND SYSTEM FOR COMMUNICATING OVER A BUS

FIELD OF THE INVENTION

The present invention relates in general to the field of communication systems comprising of master and at least one slave. In particular embodiments, the present invention relates to a digital communication system for use in an automotive environment for communicating between an ECU and one or more sensor devices, using a particular communication protocol.

BACKGROUND OF THE INVENTION

Digital buses and digital communication systems are known in the art. They can be divided into parallel communication on the one hand and serial communication on the other hand. They can also be divided in synchronous communication (such as e.g. SPI) where a clock signal is sent on a separate wire, and asynchronous communication (such as I2C or RS232) where no clock is sent along with the data, but where the bitstream has a predefined format. On top of the so-called "physical layer", other layers are also needed to exchange data between different devices, as is known from the 7-layer OSI-model.

Different systems use different protocols to serve different purposes, and various solutions are known in the art. For example, KNX is a well-known protocol for communication between devices inside a building. The asynchronous I2C protocol is typically used between a plurality of devices mounted on a single PCB. The SPI protocol is typically used between the processor device and shift register, to transfer data at high speed with minimal overhead, etc.

In an automotive environment, the CAN bus protocol and the LIN bus protocol are typically used. These protocols are designed to provide reliable communication in a harsh environment.

US2017163366A1 describes a system for interfacing between an ECU and remote sensors.

U.S. Pat. No. 7,610,135B2 describes a communication system suitable for use in an airbag system.

There is always room for improvements or alternatives.

SUMMARY OF THE INVENTION

It is an object of embodiments of the present invention, to provide a robust communication system comprising a master device and one or more slave devices adapted to communicate over a digital bus using a specific communication protocol. It is also an object of the present invention to provide such a master device and such a slave device which can be used in such a communication system.

It is a particular goal of embodiments of the present invention to provide such a system and devices, adapted for communicating data from the one or more slave devices with a reduced jitter.

It is a particular goal of embodiments of the present invention to provide such a system and devices, adapted for communicating data in a reliable way, e.g. in terms of error detection capabilities.

It is a particular goal of the present invention to provide such a system and devices, adapted for communicating data in a relatively simple way, e.g. in terms of hardware and/or software complexity.

It is a specific goal of embodiments of the present invention to provide a new communication protocol to implement Layer 2 of the OSI-model (byte transfer and synchronization layer), and Layer 3 of the OSI model (Data Link Layer), suitable for use in an automotive environment.

It is an object of particular embodiments of the present invention, to provide such a system and devices, wherein jitter between subsequent transmissions of the one or more slave device(s) is reduced.

It is an object of particular embodiments of the present invention, to provide such a system with a master device and multiple sensor devices, adapted for providing measurement data, or filtered measurement data, with a reduced jitter between the different sensors.

These objectives are accomplished by an angular position system and by a method for determining an angular position according to embodiments of the present invention.

According to a first aspect, the present invention provides a communication system comprising: —a digital serial bus; —a master device and at least one slave device operatively connected to said bus in a manner such that each device can receive bit signals from the bus, and such that each device can send dominant bit signals or non-dominant bit signals; —and wherein the master device and the at least one slave devices are adapted to communicate over the bus according to a predefined communication protocol; —and wherein the master is adapted for transmitting a continuous bitstream in the form of a plurality of frames, each frame comprising one or more words, each word having a constant time duration, —the first word of each frame being a unique word transmitted by the master for indicating the start of a frame; —one or more bits of each word being transmitted by the master as a dominant bit, for allowing the at least one slave to synchronize to the bitstream; —some of the words being transmitted by the master as a non-dominant bit, for allowing the at least one slave to overwrite; —and wherein the at least one slave is adapted for overwriting in the continuous bitstream some of said non-dominant bits thereby transmitting data in a quasi-synchronous manner.

It is an advantage of this system that the master can impose the timing of the communication on the data bus.

It is an advantage of this system that the master can send a periodic signal to each of the slave devices with minimum jitter. This periodic signal can be used as a "broadcast read command" in case the system has multiple slaves. But the system can also be used to communicate between a single master and a single slave, and also in this case jitter (between the time of reception of different values obtained from the slave) is reduced, as compared to for example the case where the master and the slave communicate via an asynchronous communication protocol. And the "start-of-frame" signal may be one of several values, which may be used for other purposes, such as for example: resetting the devices connected to the bus, or sending data to a particular slave, or changing the frame format, etc.

With "continuous bitstream" is meant a "pause-less bitstream", meaning that all words are concatenated.

It is an advantage of using a continuous bitstream, or a pause-less bitstream, that data can be transmitted at a high speed (e.g. the maximum speed for a given bit duration), and that no time is lost between frames, and that the risk of misalignment is drastically reduced, or minimised.

As used herein, the terms "non-dominant" and "recessive" are used as synonyms, but one or the other word is typically used depending on the context (e.g. the word "recessive" is typically used in the context of CAN-bus, whereas the word "non-dominant" is typically used in the context of a "wired-AND" bus on a PCB.

It is a major advantage of this system that the bus interface can be implemented based on standard UART's or USART's, with no or minimal amount of additional hardware.

It is an advantage of this bus protocol that bus collision is avoided. In this way also read transmissions are avoided.

It is an advantage of this bus protocol that the devices need not interrupt communication at the bit level because another device is simultaneously communicating another value on the bus (as is the case for example in the KNX protocol).

This bus system is ideally suited in an automotive environment, where guaranteed and predictable performance is mandatory.

This bus system is ideally suited in an automotive environment where one master communicates with a plurality of slaves, for example with a plurality of Hall elements, in order to determine a motor position, for example.

It is assumed that each sensor has a predetermined identifier (ID).

The at least one slave should continuously monitor the bitstream, and align its timing with the bitstream so as to be bit-synchronous. The slave devices are adapted to continuously monitor the bus.

In an embodiment, the master device and the at least one slave device may be connected to the bus in a "wired-AND" or a "wired OR" configuration, for example in a manner similar to the I2C bus, or similar to CAN bus.

In an embodiment, each bit has an equal duration.

In an embodiment, the master is adapted for transmitting said continuous bitstream in the form of a plurality of frames, —each frame comprising one or more words, including a first word and optionally one or more further words, —each word comprising a plurality of bits, including a start bit, a plurality of data-bits and one or more stop bits; —the master transmitting the start bit of each word as a dominant bit; —the first word of each frame comprising a start-of-frame value selected from a limited list of values for identifying the start of each frame, the start-of-frame value having at least one dominant data bit at a predefined data bit position of said data-bits; —each further word allocated to the at least one slave transmitted as non-dominant bits for allowing the at least one slave to overwrite some of the bit signals on the bus; and wherein each slave is adapted for transmitting data in further words of the frame allocated to this particular slave, in a bit-synchronous manner with the bitstream, and such that: —the start bit of each further word is transmitted as a non-dominant bit; —the data bit at the predefined data bit position is transmitted as a non-dominant bit; —the other data-bits of each further word contains data values [also called "payload data"] to be transmitted.

The start-of-frame value (SOF) can also be used for indicating which words of the frame are allocated to which slave (for example: when using a frame format with 7 words, a particular SOF value could mean that: word 1 is to be sent by the master, word 2 to 4 are allocated to slave with ID=1, word 5 to 7 are allocated to slave with ID=2).

A slave is only allowed to overwrite non-dominant bits of the word to this particular slave, and is adapted for either not transmitting data on the bus or for transmitting only non-dominant bits (logical_1), during the transmission of the other words (allocated to the master or to another slave device).

In an embodiment, the bus carries analogue signals in accordance with or compatible with the physical layer standard ISO 11898-1.

In an embodiment, the bus carries analogue signals in accordance with or compatible with the physical layer standard ISO 11898-2.

In an embodiment, the bus carries analogue signals in accordance with or compatible with the physical layer standard ISO 11898-3.

In an embodiment, the bus carries analogue signals in accordance with or compatible with TTL voltage levels, at least in as far as the voltage levels are concerned. Aspects such as "bit stuffing" are not used in the present invention. Instead, each word has a constant duration.

In an embodiment, the bus carries analogue signals in accordance with or compatible with the voltage levels specified in the physical layer standard ISO 11898-2.

In an embodiment, the bus carries analogue signals in accordance with or compatible with the voltage levels specified in the physical layer standard ISO 11898-3.

In an embodiment, the bus carries analogue signals in accordance with or compatible with the physical layer for high-speed CAN.

In an embodiment, the bus carries analogue signals in accordance with or compatible with the physical layer for low-speed, fault-tolerant CAN.

In an embodiment, the bus carries analogue signals in accordance with or compatible with the physical layer for CAN FD.

In an embodiment, the digital serial bus comprises only two wires or only two tracks.

In an embodiment, the digital serial bus comprises only four wires or only for tracks.

In an embodiment, the system comprises at least three slave devices or only three slave devices.

In an embodiment, the digital serial bus comprises only four wires.

In an embodiment, the digital serial bus is a single ended, single wire track on a PCB, for example carrying TTL-level signals.

In an embodiment, the digital serial bus is a two-wire, differential signal, for example carrying ECL-level signals on a PCB.

In an embodiment, the predefined data bit position "sow" is the first bit of the data-bits.

For example, in embodiments wherein the data-bits are configured with "least significant bit first", this means that the LSB (least significant bit) is the "predefined data bit position" (which is dominant for the SOF and is non-dominant for the slave-words).

For example, in embodiments wherein the data-bits are configured with "most significant bit first", this means that the MSB (most significant bit) is the "predefined data bit position".

It is an advantage of this embodiment that it is easier to adjust or to rectify the timing of the bus interfaces of the slaves so as to better match the timing of the master bus interface.

In an embodiment, the limited list of values for identifying the start of each frame "SOF" comprises one or more of the following values 0xFE, 0xFC, 0xF8, 0xF0, 0xE0, 0xC0, 0x80, 0x00 when expressed with least-significant bit first.

Each of these SOF-values may also be used to define a particular frame structure amongst a plurality of allowed frame structures implemented in the devices connected to the bus.

As an example, in an exemplary system comprising one master and two slave devices, the master may decide to use two different start-of-frame values, for example the value 0xFE could be used to inform the slaves that four words are allocated to each slave per frame (e.g. as shown in FIG. 28), and the value 0xFC could be used to inform the slaves that three words are allocated to each slave per frame. Other values may be used for example for resetting all the slaves, or for enforcing a resync to all the slaves, or to address a particular slave, etc.

In an embodiment, each frame contains a predefined number "N" of words, including one word containing the SOF-value to be transmitted by the master, and including "N−1" words containing payload data transmitted by the at least one slave.

It is an advantage of this embodiment that it is easier to adjust or to rectify the timing of the bus interfaces of the slaves so as to better match the timing of the master bus interface.

In an embodiment, the number of slaves connected to the bus is exactly two, and the value (N−1) is an integer multiple of two, for example 2 or 4 or 6 or 8 or 10, allowing each slave device to transmit 2×7=14 payload bits, or 4×7=28 payload bits, or 6×7=42 payload bits, or 8×7=56 payload bits, or 10×7=70 payload bits per frame respectively.

In an embodiment, the number of slaves connected to the bus is exactly three, and the value (N−1) is an integer multiple of three, for example 3 or 6 or 9 or 12 or 15.

In an embodiment, the number of slaves connected to the bus is exactly four, and the value (N−1) is an integer multiple of four, for example 4 or 8 or 12 or 16 or 20.

In an embodiment, the duration of one bit is a value in the range from 200 ns to 1000 ns, for example substantially equal to 200 ns, or substantially equal to 300 ns, or substantially equal to 400 ns, or substantially equal to 500 ns, or substantially equal to 600 ns, or substantially equal to 700 ns, or substantially equal to 800 ns, or substantially equal to 900 ns, or substantially equal to 1000 ns, but the invention is not limited to this particular range, and can also be used if the bid timing is larger than 1 μs, for example in the order of 1 μs to 10 μs, or in the order of 10 μs to 100 μs.

In an embodiment, the master device comprises a bus-interface adapted for receiving data from at least one slave device connected to the bus; and the master device further comprises a processing unit for extracting the data-bits transmitted by the at least one slave device.

The master device may be implemented as an integrated circuit (IC) comprising said processing unit, and a UART. The master device may comprise an integrated or a stand-alone transceiver, e.g. a CAN-transceiver.

In an embodiment, the slave device comprises a bus-interface adapted for transmitting data to a master device connected to the bus; and—wherein the slave device further comprises a readout unit and/or a processing unit adapted for providing data to the master device upon request.

The slave device may be implemented as an integrated circuit (IC) comprising said readout unit and/or said processing unit, and a UART. The slave device may comprise an integrated or a stand-alone transceiver, e.g. a CAN-transceiver.

According to a second aspect, the present invention also provides a device suitable for use in the system according to the first aspect and having the features of the master device.

According to a third aspect, the present invention also provides a device suitable for use in the system according to the first aspect and having the features of the slave device.

In an embodiment, the slave device further comprises a sensor unit adapted for measuring a physical quantity at moments in time unrelated to a timing of the bus-interface part, and for providing measurement data indicative of the measured physical quantity; —and wherein the readout unit and/or the processing unit unit comprises a memory and/or a buffer for storing the measurement data provided by the sensor unit.

In an embodiment, the processing unit is adapted for estimating a momentary value of the physical quantity, based on one or more measurement data stored in the memory or the buffer, e.g. by extrapolating measurement data.

In an embodiment, the processing unit is adapted for estimating a value that the physical quantity would have at a predefined time period earlier than the moment of arrival of a frame, based on one or more measurement data stored in the memory or the buffer, e.g. by interpolating measurement data.

In an embodiment, the processing unit is adapted for providing data at a higher rate than the actually measured data, and for storing this data in said memory or buffer; and the readout unit is adapted for providing a recently stored value from said memory or from said buffer upon request, or upon arrival of a new frame.

In an embodiment, measurement data provided by the sensor unit is stored in said memory or buffer, and a recently stored value is read from said memory or from said buffer upon request, or upon arrival of a new frame.

In this embodiment, the data is not interpolated or extrapolated, but for example simply stored after analog-to-digital conversion or format conversion based on the last value alone, and for example provided as such to the bus-interface part.

In an embodiment, measurement data provided by the sensor unit is stored in said memory or buffer along with a counter value or a timestamp, and wherein both the measurement data and the counter value or timestamp, or a value derived therefrom, is provided to the bus-interface upon request, or upon arrival of a new frame.

The invention is also directed to the use of such a communication system in an automotive environment, to transfer data from one or more sensor unit(s) to a master device (called ECU).

The invention is also directed to the use of such a communication system for determining a motor position by using sensor devices comprising one or more magnetic sensor elements, which sensor elements are adapted for communicating a measured value of the magnetic field measured, or a value derived therefrom (e.g. an amplified version thereof), and wherein the master (or ECU) is adapted for determining a motor position based on the plurality of values obtained from the plurality of sensor devices.

Preferably, each word has at most 10 bits, or at most 9 bits, or at most 8 bits.

In exemplary embodiments, the sensor units output new data at 1 MHz, and the latency should be less than 5 μs, and the jitter between subsequent measurements of a single sensor, and the jitter between measurements of the different sensors should have less than 1 μs.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIGS. 20(a) to 20(c) illustrate by means of an example, how a slave device can get in sync with a bitstream after power up.

FIG. 27 shows a "generic frame format" as may be used in embodiments of the present invention.

FIG. 28 shows an exemplary frame format with 9 words per frame, as may be used in communication systems with one master and two slaves or sensor devices, which are read periodically, and where each sensor device can send 4 words per frame.

FIG. 29 shows an exemplary frame format with 5 words per frame, as may be used in communication systems with one master and a single slave or sensor device, which is read periodically, and where the sensor device can send 3 words per frame.

FIG. 30 is another representation of the frame format shown in FIG. 28, where A[i=0 . . . 3] denotes the words allocated to the first slave, and B[i=0 . . . 3] denotes the words allocated to the second slave.

FIG. 31 shows an exemplary bit allocation scheme for a frame structure having three words allocated to one or more slave devices, as may be used in embodiments of the present invention.

FIG. 32 shows another exemplary bit allocation scheme for a frame structure having four words allocated to one or more slave devices, as may be used in embodiments of the present invention.

FIG. 33 shows another exemplary bit allocation scheme for a frame structure having five words allocated to one or more slave devices, as may be used in embodiments of the present invention.

Figure 1:
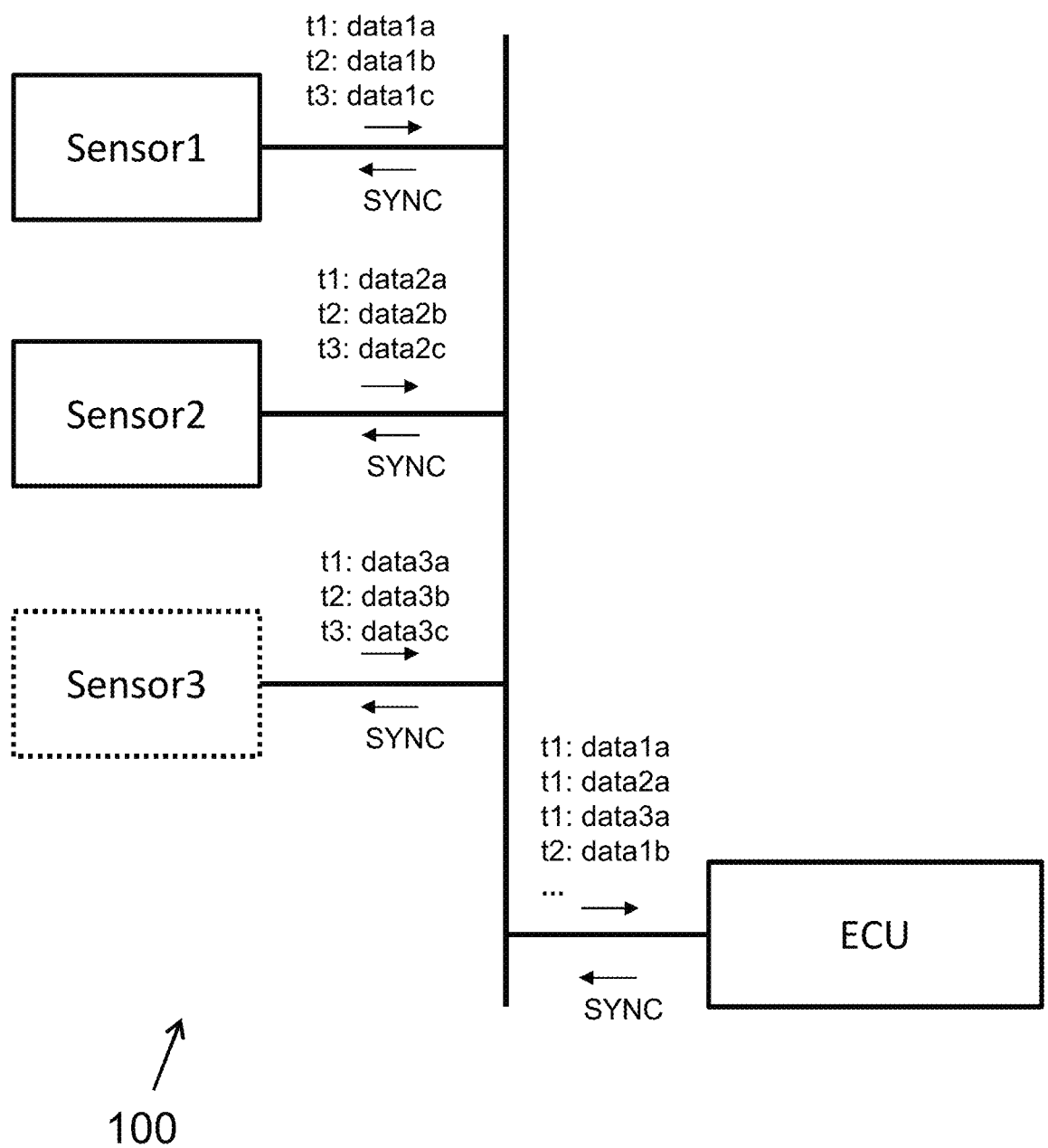
FIG. 1 is a block diagram showing a communication system known in the art, wherein a master (ECU) transmits a sync pulse to multiple sensor devices, causing the devices to take a measurement in the response to the sync pulse, and to retransmit the measured data to the ECU in the response to the sync pulse.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In this document, the terms "non-dominant bit" and "recessive bit" are used as synonyms, irrespective of whether the physical signal is implemented as a singled-ended signal (e.g. TTL level signal) or as a differential signal (e.g. as used in ECL logic or in the CAN bus). The term refers to a bit signal on a bus that may be overruled by another device also connected to the bus, similar to what is encountered for example in a "wired and" or a "wired or" bus configuration, as encountered for example in the physical layer of the I2C bus protocol, the KNX bus protocol, the CAN-bus or CAN-FD bus or LIN-bus protocol.

Unless otherwise mentioned, throughout this document and the Figures, a logical '0' means a dominant bit, and a logical '1' means a non-dominant bit, as in a "wired-AND" configuration.

With 0xFE is meant the decimal value 254 in hexadecimal notation (using the same notation as in the C-programming language).

Many control systems (e.g. temperature control systems, chemical process control systems, servo-control systems, cruise-control systems, etc.) use a digital circuit to perform a digital control loop, where in each iteration one or more physical quantities are measured, where the measured values are processed (e.g. to calculate an angular position and to compare the calculated position with a desired position), and where one or more actuation signals are provided to an actuator or a motor or the like.

In many of these systems the reaction speed of the system is much slower than the speed of the measurements, and delays between the moment of taking the measurement(s) and providing the next actuation signal hardly have an influence on the behaviour of the system. For example, in a heating system of a building, the thermal inertia of the conduits and the room to be heated or cooled are so large that a response in the order of seconds is more than adequate.

In other applications, however, such as for example "airbag control systems", the reaction speed of the system needs to be much higher for a correct functioning of the system. For example, the communication system described in U.S. Pat. No. 7,610,135B2 should react within a time period of 500 ns or less. But this speed is not adequate for motor control systems or engine control systems, where a motor is running for example at at speed of 2000 to 5000

RPM or more, where certain parameters need to be accurately adjusted multiple times per rotation. Such systems require even higher communication speed, where aspects such as latency and jitter play an important role. The present invention is situated in this context.

FIG. 1 shows a block diagram of a communication system known in the art, that addresses this problem. In this system, a master (ECU) transmits a "sync pulse" to multiple sensor devices, which sync pulse causing the devices to take a measurement in response to the sync pulse (ideally all at exactly the same moment in time), and causes the devices to return the measured values to the ECU in the response to the sync pulse (ideally as soon as possible with no latency).

In reality, however, there is always a certain (non-zero) difference between the moments in time when the different sensors take a measurement, and it also requires a certain (non-zero) amount of time to process the measurement (e.g. to amplify and/or to filter the data and/or to perform an A/D conversion) and to transmit the data over the bus (e.g. to serialize the data and transmit the data over a serial bus). This is one of the underlying problems of the present invention.

Figure 2:
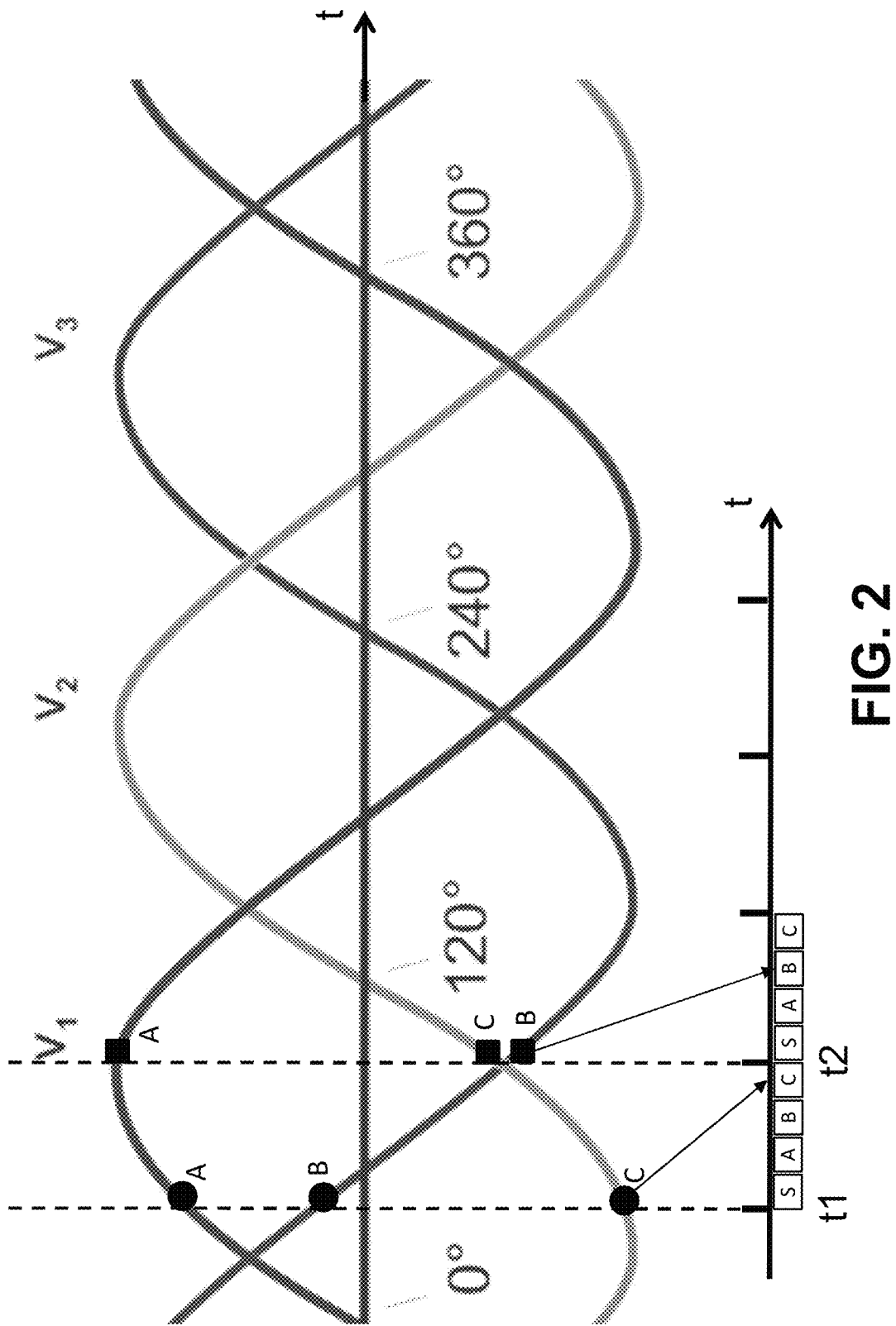
FIG. 2 shows three exemplary voltage waveforms (top) and shows an exemplary bitstream (bottom) to illustrate how a periodic sync pulse sent by the master causes each of the sensor devices to take a new measurement, and to transmit the measured data to the master before the next pulse arrives.

FIG. 2 shows a possible solution to this problem. FIG. 2 shows three exemplary voltage waveforms (top) and shows an exemplary bitstream (bottom) containing a periodic sync pulse (or data indicative to such a sync pulse), which can be send by the master device, and which causes each of the sensor devices to take a new measurement. In the example, the first sync pulse (indicated by "S") causes three sensors to take a measurement (indicated by black circles A,B,C), and these values are subsequently transmitted to the master device, ideally before the arrival of the next pulse.

As will become clear further, the present invention provides a communication system, or a communication protocol, which is highly suitable for periodically transporting commands (e.g. a broadcast read command) from a master to one or more slave devices (e.g. sensor devices), and for transporting values provided by the slaves (e.g. sensor devices) to the master.

More specifically, (and as illustrated for example by FIG. 4, FIG. 15 and FIG. 16) the present invention provides a communication system comprising: a digital serial bus; a master device and at least one slave device operatively connected to said bus in a manner such that each device can receive bit signals from the bus, and such that each device can send dominant bit signals or non-dominant bit signals. The master device and the at least one slave devices are adapted to communicate over the bus according to a predefined communication protocol. The master is adapted for transmitting a continuous bitstream in the form of a plurality of frames, such that a periodic signal with minimal jitter is sent on the bus. Each frame comprising one or more words. Each word has a constant time duration. The first word of each frame being a unique word (selected from a small list of unique words) transmitted by the master for indicating the start of a frame. One or more bits of each word is transmitted by the master as a dominant bit (for example the first bit of each word), for allowing the at least one slave to easily synchronize to the bitstream. Some of the words are transmitted by the master containing non-dominant bits, for allowing the at least one slave to overwrite. The at least one slave is adapted for overwriting in the continuous bitstream (sent by the master) some of said non-dominant bits, thereby transmitting data in a quasi-synchronous manner, despite that there is no separate clock line.

This protocol not only works for sensor devices, but also for other devices, such as for example communication gateways connected to the bus. The present invention will be explained mainly for sensor devices for ease of explanation, but the present invention is not limited thereto.

Referring now to the figures.

FIG. 1 is already mentioned above. The reader can find more details in US2017163366A1.

FIG. 2 is also discussed above. It is noted that the bitstream described in FIG. 2 seems to be different from the bitstream described in US2017163366A1.

Figure 3:
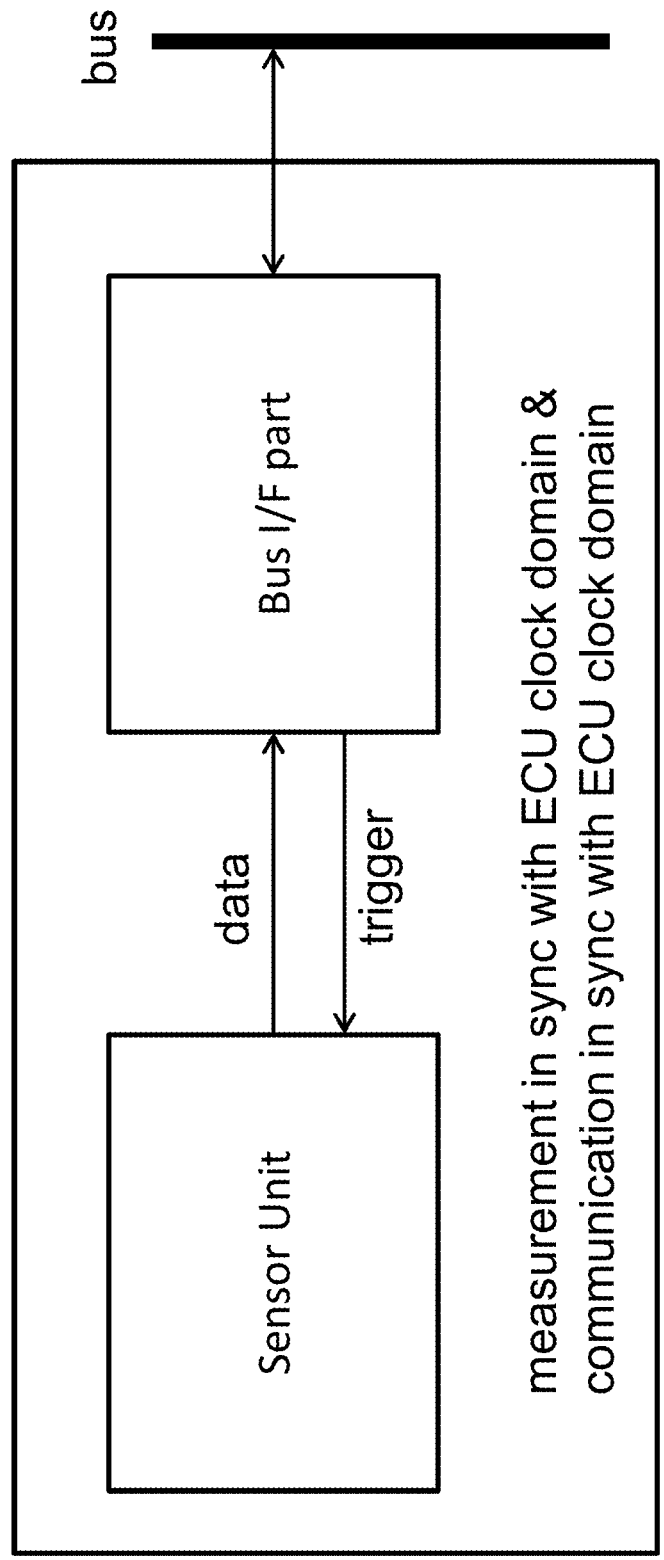
FIG. 3 shows a possible high-level block diagram of the sensor devices shown in FIG. 1. It is important that the sensor unit takes a measurement in response to the "sync pulse" sent by the ECU (not shown).

FIG. 3 shows a possible high-level block diagram of the sensor devices shown in FIG. 1. A key aspect of the system shown in FIG. 1 is that the sensor units of all sensor devices take a measurement in response to a sync pulse sent by the ECU (not shown in FIG. 3 but see FIG. 1).

Figure 4:
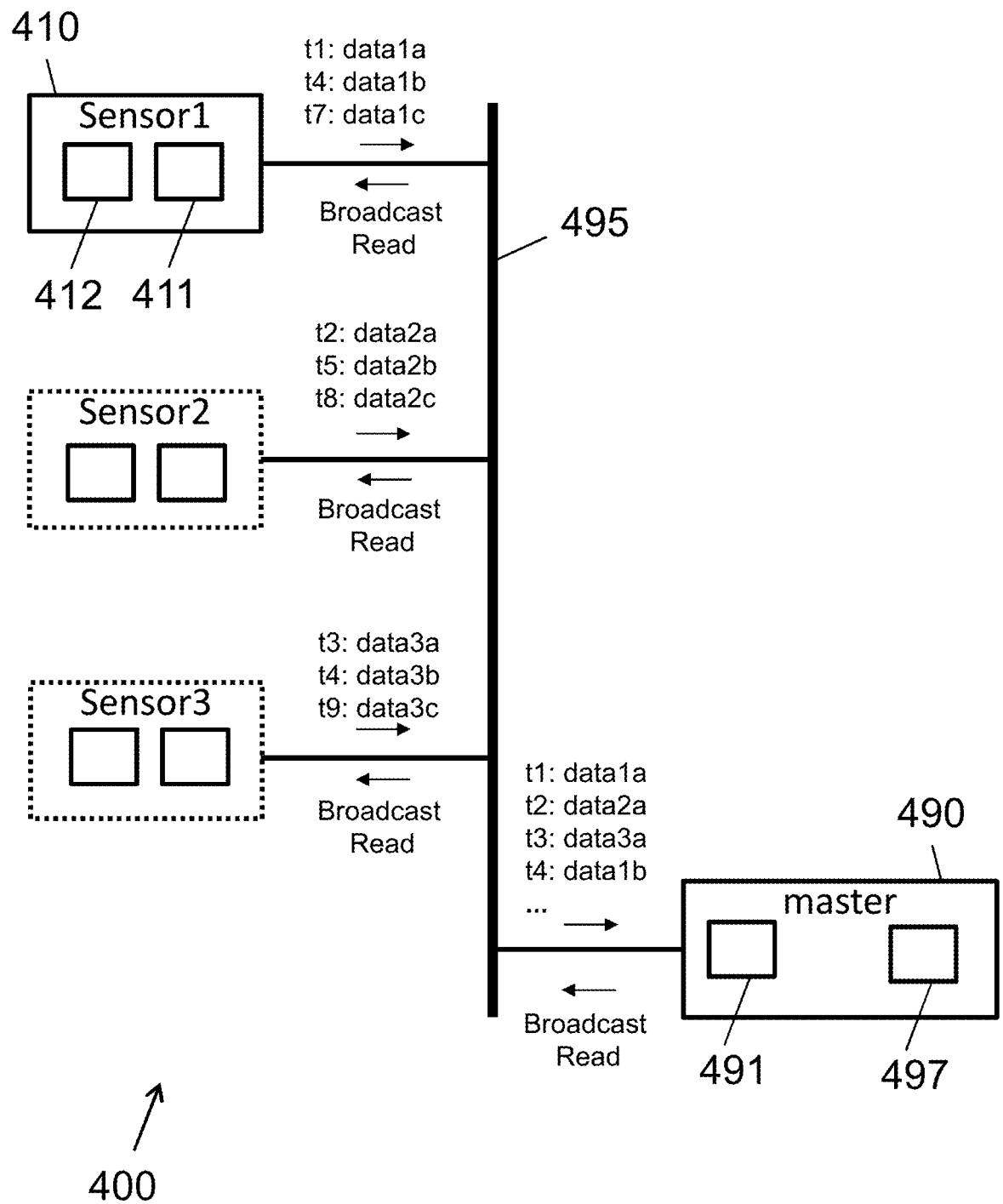
FIG. 4 shows a communication system according to an embodiment of the present invention, comprising a digital data bus, and a master device and at least one slave device (in the example a sensor device) operatively connected to the bus.

FIG. 4 shows a communication system 400 according to an embodiment of the present invention, comprising a digital data serial bus 495, and a master device 490 (sometimes also referred to as "ECU", but the present invention is not limited to automotive applications) and at least one slave device 410 (in the example a sensor device) operatively connected to the bus 495.

Figure 12:
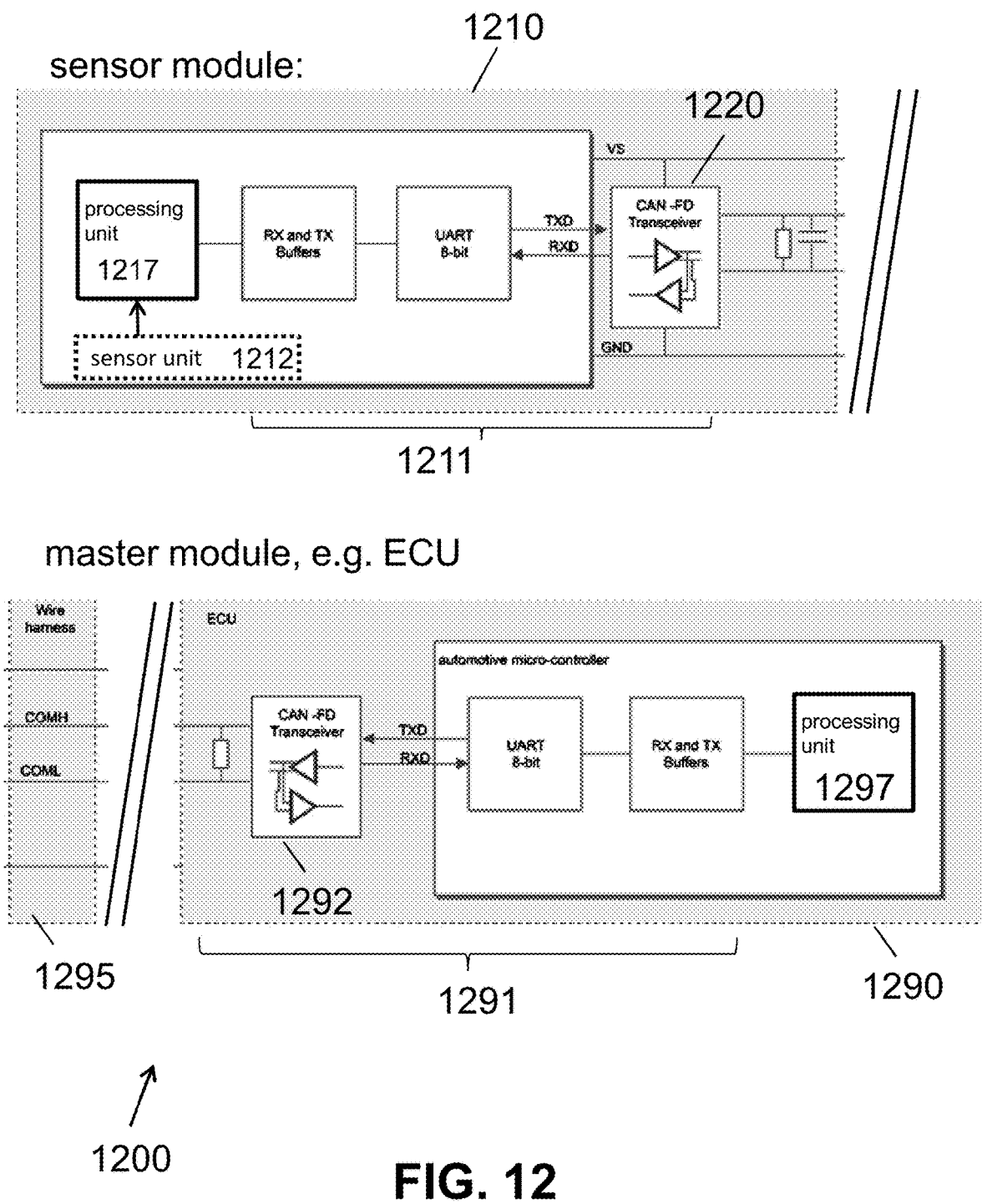
FIG. 12 is a schematic representation of a block diagram of a communication system according to an embodiment of the present invention, showing a sensor module (upper part of the FIG) and a digital bus (lower left part of the FIG) and a master device (lower right part of the FIG), using two external CAN-FD transceivers (not integrated inside the sensor module and the master module).
Figure 13:
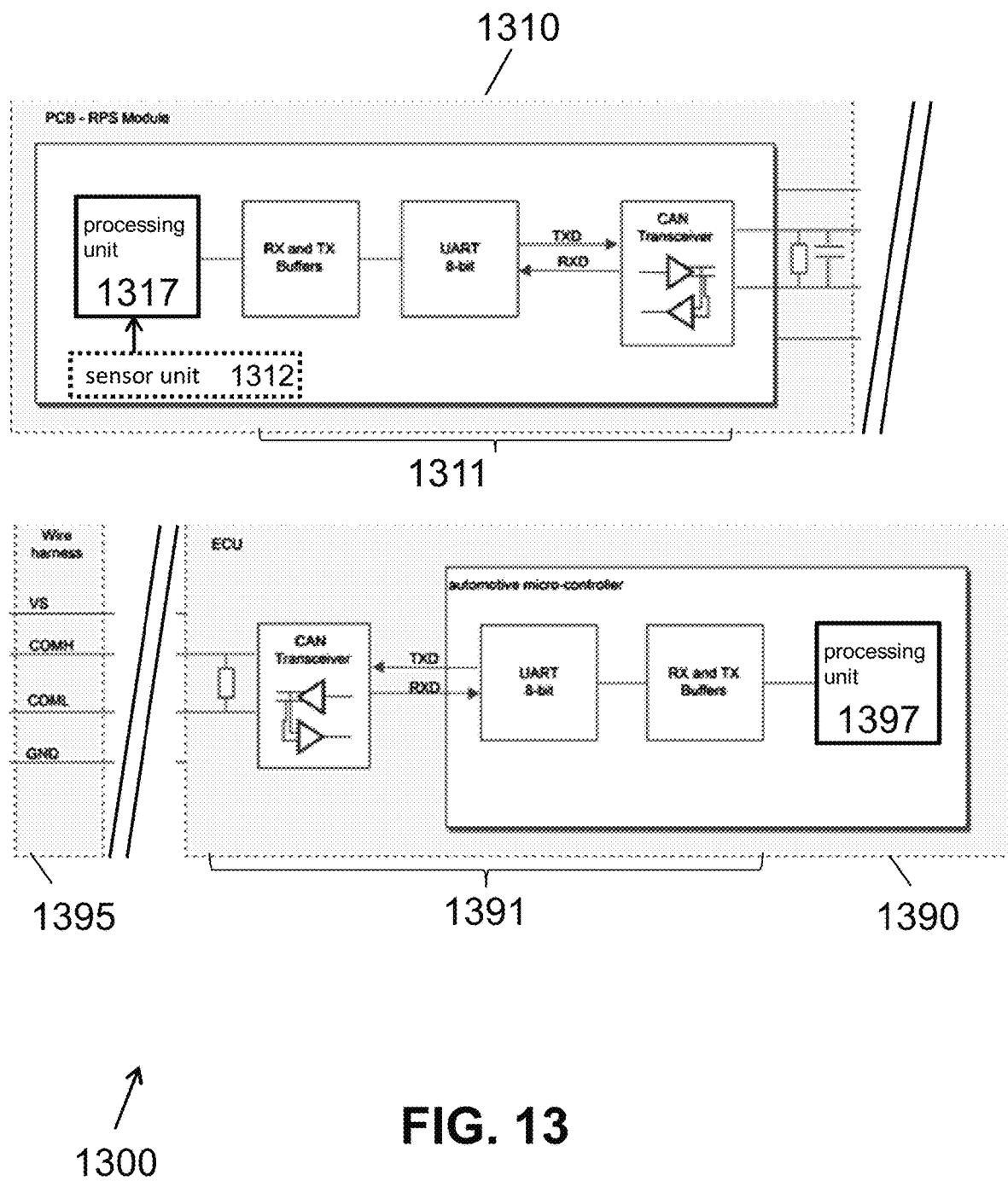
FIG. 13 is a variant of the block diagram of FIG. 12, where the CAN transceiver is embedded in the sensor device, e.g. as a multi-die chip.

FIG. 12 and FIG. 13 show more details about the possible implementation of such master device and such a slave device for aspects related to the communication.

FIG. 5 to FIG. 11 show more details about possible implementations of slave devices in case they comprise a sensor unit, in which case the slave devices are sensor devices.

In order to understand the main principles of the present invention it suffices to know that the master device 490 typically contains a processing unit 497 and a bus interface 491, and that the sensor devices 410 typically contain a bus interface 411 and a sensor unit 412.

FIG. 4 illustrates how the master device can send a periodic broadcast read command to the slave devices, and that the slave devices periodically return values indicative of the physical quantity they have to measure, to the master device. In contrast to the system of FIG. 1, however, the sensor devices do not take the measurements in response to the broadcast read command, as will be explained in more detail further, by way of several examples.

Depending on the application, the bus 595 may be implemented for example as a single copper track on a printed circuit board (PCB), since a ground plane and a voltage plane are typically available anywhere on the PCB. Such a bus may carry TTL level signals. In case the master and the slaves are separated over the distance of at least 1 meter, preferably a cable is used. The cable may for example comprise two wires, adapted for carrying a differential signal. The cable may additionally comprise a supply voltage signal VDD and the reference signal GND. Digital buses are well known in the art, as well as aspects related to reflection and termination, and therefore need not be explained in further detail here. In preferred embodiments of the present invention, a two wire or four wire CAN-FD bus is used, in as far as the physical layer is concerned.

Figure 5:
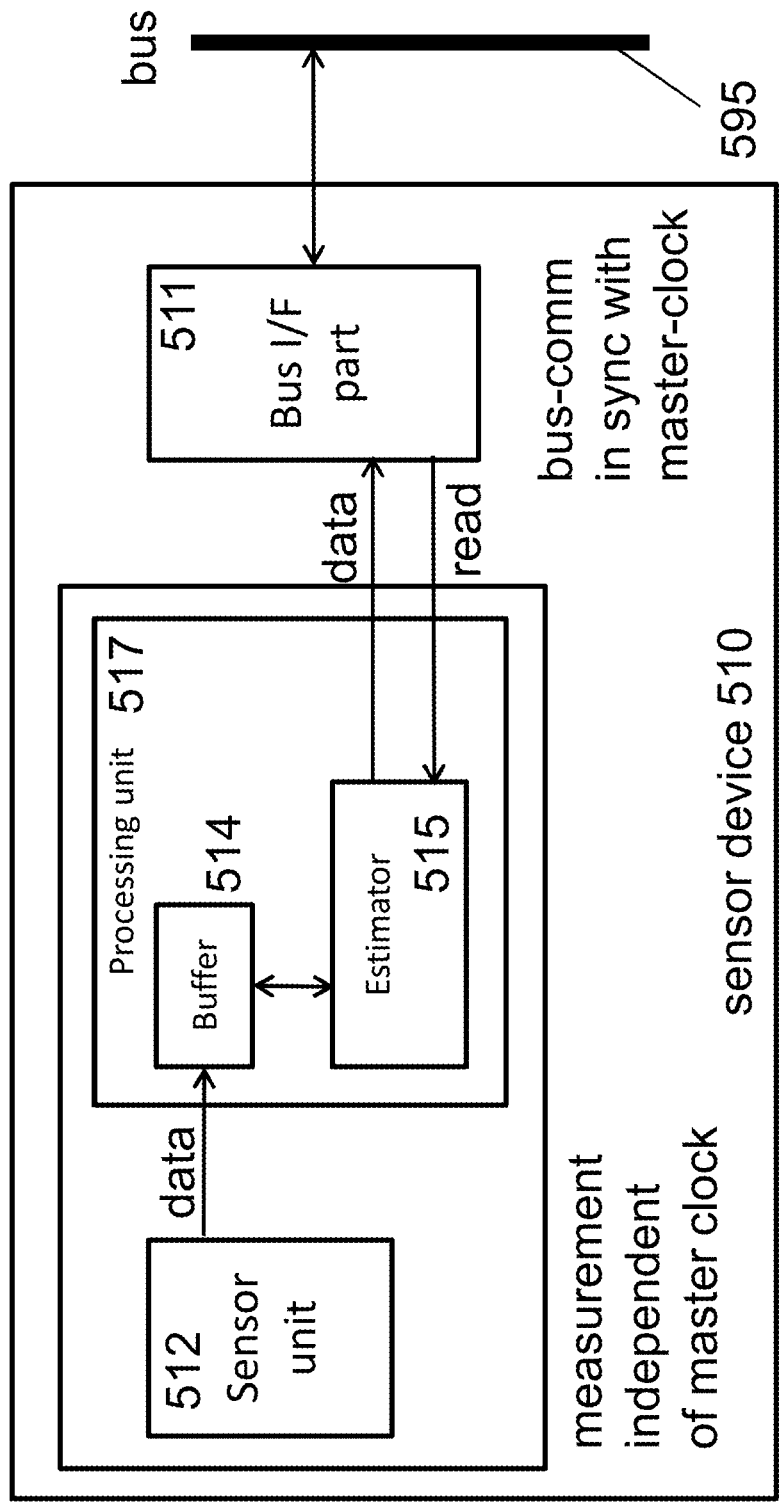
FIG. 5 shows a high-level block diagram of a sensor device according to an embodiment of the present invention, as can be used in the system of FIG. 4.

FIG. 5 shows a high-level block diagram of a sensor device 510, as can be used in the system of FIG. 4. The sensor device 510 comprises a bus-interface 511 adapted for receiving data from the master (not shown in FIG. 5 but see FIG. 4) via the bus 595, and for transmitting data to the master via the bus 595. Such bus interfaces are known in the art and therefore need not be described in more detail here.

The sensor device 510 also contains a sensor unit 512 for measuring a physical quantity, for example a magnetic field strength. The sensor unit 512 takes measurements irrespective of commands coming from the bus (as illustrated by the arrow "data", but there is no arrow "trigger"). The sensor unit may for example take periodic measurements at a clock frequency independent of the frequency at which frames or words arrive on the bus interface. In an example the sensor unit takes measurements at a frequency in the range from 250 kHz to 4 MHz, e.g. in the range from 500 kHz to 2 MHz, for example at a frequency of about 1 MHz. The sensor unit 512 may amplify and/or digitize the data (using an A/D convertor, not shown) and provide the amplified and/or digitized data to a processing unit 517. The processing unit 517 may comprise a dedicated piece of hardware, for example a state machine or a digital module, or may comprise a programmable processor or a DSP, or any other suitable circuitry. The processing unit 517 comprises or is connected to a memory or a buffer 514 for storing data received from the sensor unit, and comprises an estimator unit 515, adapted for calculating or estimating a value the physical quantity to be measured would have at the moment of request (e.g. in response to a read command sent over the bus interface). Thus, in this embodiment, the estimator calculates a value based on data stored in the memory or buffer 514 in response to a read command (e.g. a broadcast read command), but the sensor unit operates independently.

Figure 6:
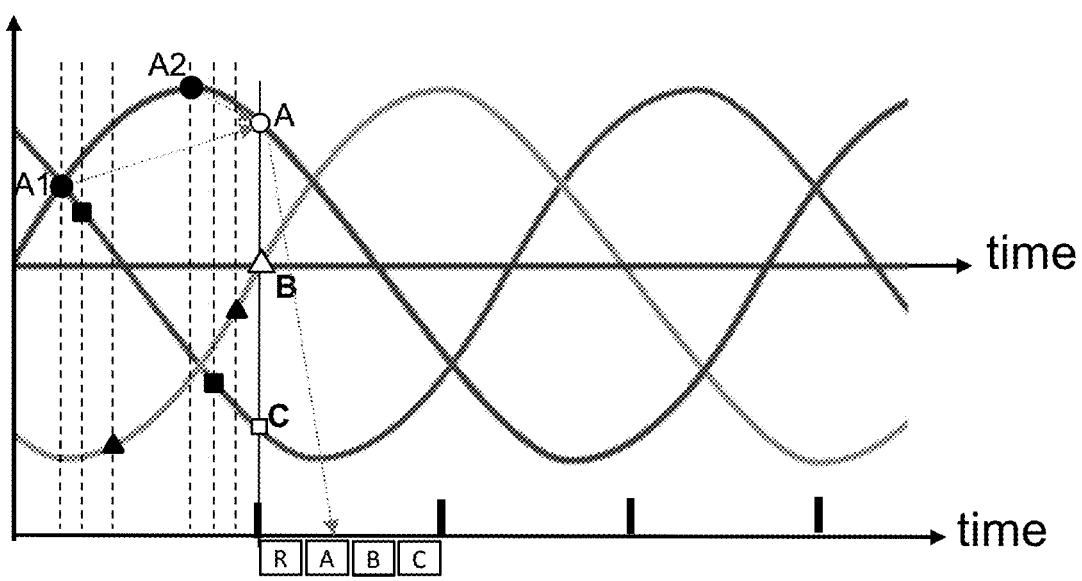
FIG. 6 shows three exemplary waveforms (top) and shows an exemplary bitstream (bottom) as may be used in combination with the sensor device of FIG. 5, to illustrate how a periodic broadcast read command sent by the master causes each of the sensor devices to estimate the present value (e.g. based on extrapolation of measured values stored before the arrival of the read command), and to transmit the estimated value to the master.

FIG. 6 shows three exemplary waveforms (top) and shows an exemplary bitstream (bottom) as may be used in combination with the sensor device of FIG. 5, to illustrate how a periodic broadcast read command sent by the master causes each of the sensor devices to estimate the present value "A" (e.g. based on extrapolation of measured values A1, A2 stored before the arrival of the read command), and to transmit the estimated value "A" to the master. Algorithms for extrapolating are not the main focus of the present invention and are known in the art known in the art, and therefore do not need to be described in detail here.

Figure 7:
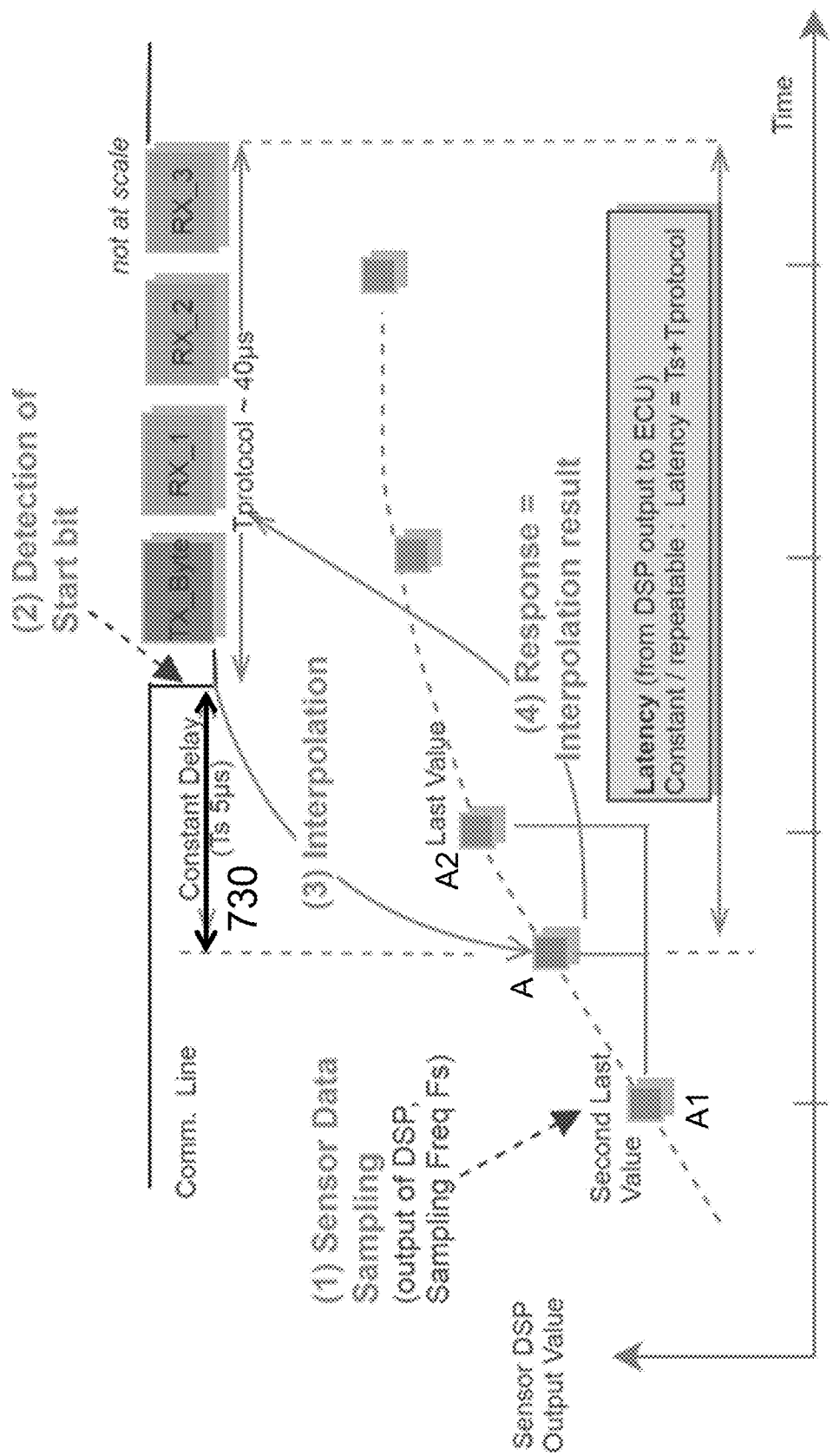
FIG. 7 shows an exemplary waveform (lower half) and a bitstream with a falling edge (upper half) as may be used in combination with the sensor device of FIG. 8, to illustrate how a periodic broadcast read command sent by the master can cause the sensor device to calculate or to estimate the value the physical quantity would have had at a predetermined time period $\Delta T$ before the time of arrival of the command by interpolating two measured values both taken before the arrival of the read command, and stored in a memory or buffer, optionally together with a timestamp or a counter value.

FIG. 7 shows an exemplary waveform (lower half) and a bitstream with a falling edge (upper half) as may be used in combination with a sensor device 710 of FIG. 5, to illustrate how a periodic broadcast read command sent by the master can cause the sensor device to calculate or to estimate the value the physical quantity would have had at a predetermined time period $\Delta T$ before the time of arrival of the command by interpolating two measured values both taken before the arrival of the read command, and stored in a memory or buffer, optionally together with a timestamp or a counter value.

This embodiment is advantageous in several ways, for example because interpolation often gives better results than extrapolation. Another important advantage of this embodiment is that it allows multiple sensor devices to provide an estimated value at approximately the same moment of time, namely the time of reception of the read command (e.g. defined by the falling edge shown in FIG. 7) minus the predefined constant delay $\Delta T$. An example of such an application is an angular position sensor where values obtained from different sensors are to be combined. In such applications, a constant latency $\Delta T$ is less problematic than time jitter between different measurements. Moreover, the latency may in some applications be at least partly compensated.

Figure 8:
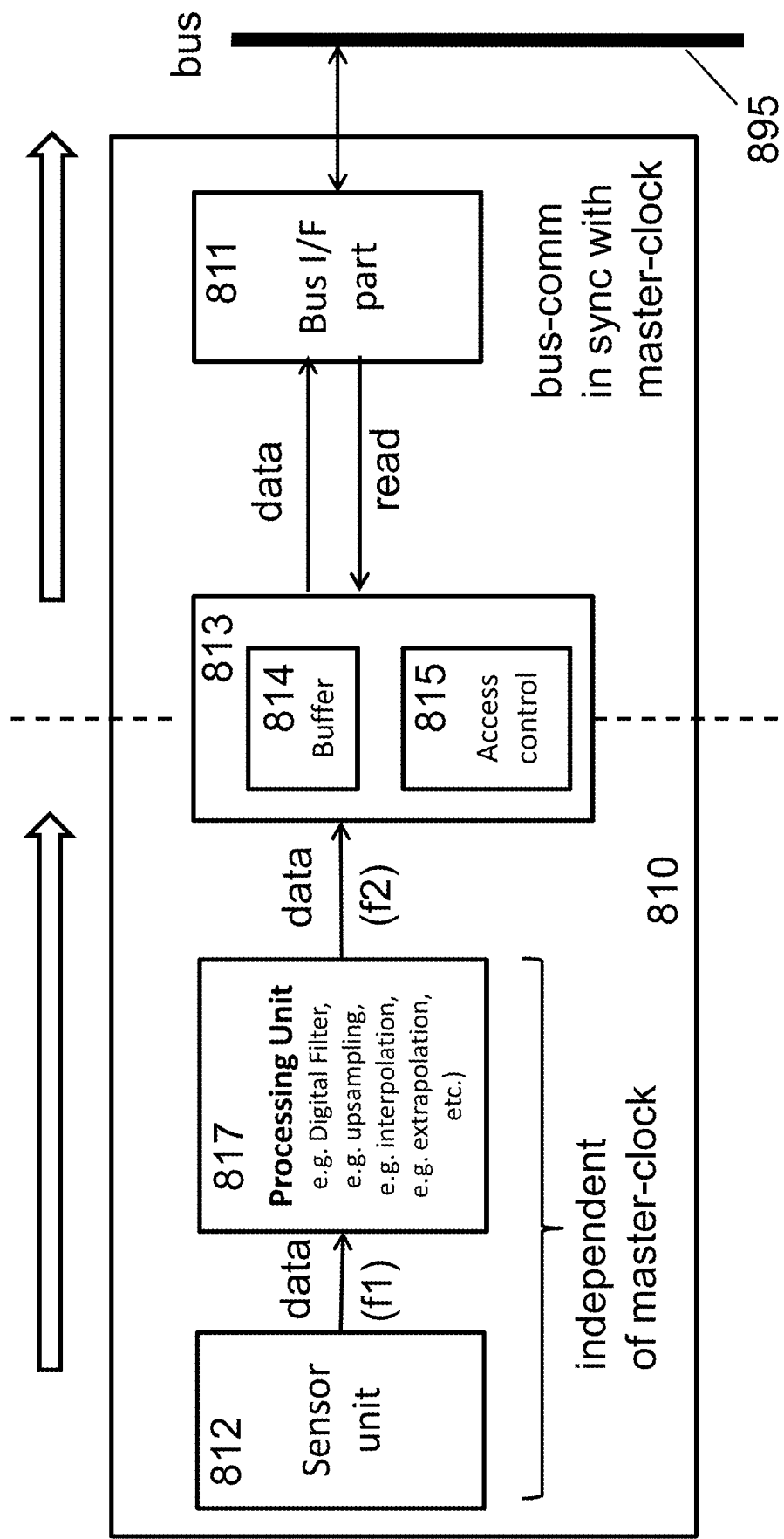
FIG. 8 shows a high-level block diagram of a sensor device according to an embodiment of the present invention, as can be used in the system of FIG. 4.

FIG. 8 shows a high-level block diagram of a sensor device 810, as can be used in the system of FIG. 4. This sensor device can be seen as a variant of the sensor device shown in FIG. 5, and the common aspects will therefore not be repeated. The main difference between the sensor units of FIG. 5 and the sensor unit of FIG. 8 is that the processing unit 817 is located between the sensor unit 812 and the readout circuit 813. Similar as in FIG. 5, the readout circuit 813 stores data in a memory or a buffer 814, and provides a value derived from values stored in the buffer upon request, e.g. in response to a broadcast read command coming from the bus-interface. But in contrast to FIG. 5, the processing unit 817 is calculating new values independently of the master clock. Thus, the readout circuit 813 decouples the clock domains.

The processing unit 817 may perform different kinds of algorithms, including one or more of the following: digital filtering, upsampling, delaying, predicting, extrapolating, interpolating, etc.

In a specific embodiment, the processing unit 817 is adapted for performing a "tracking loop" as described in detail in EP18153346.4, filed by the same applicant on 25 Jan. 2018, with Title "position sensing device", which document is included herein by reference in its entirety for all purposes.

Figure 9:
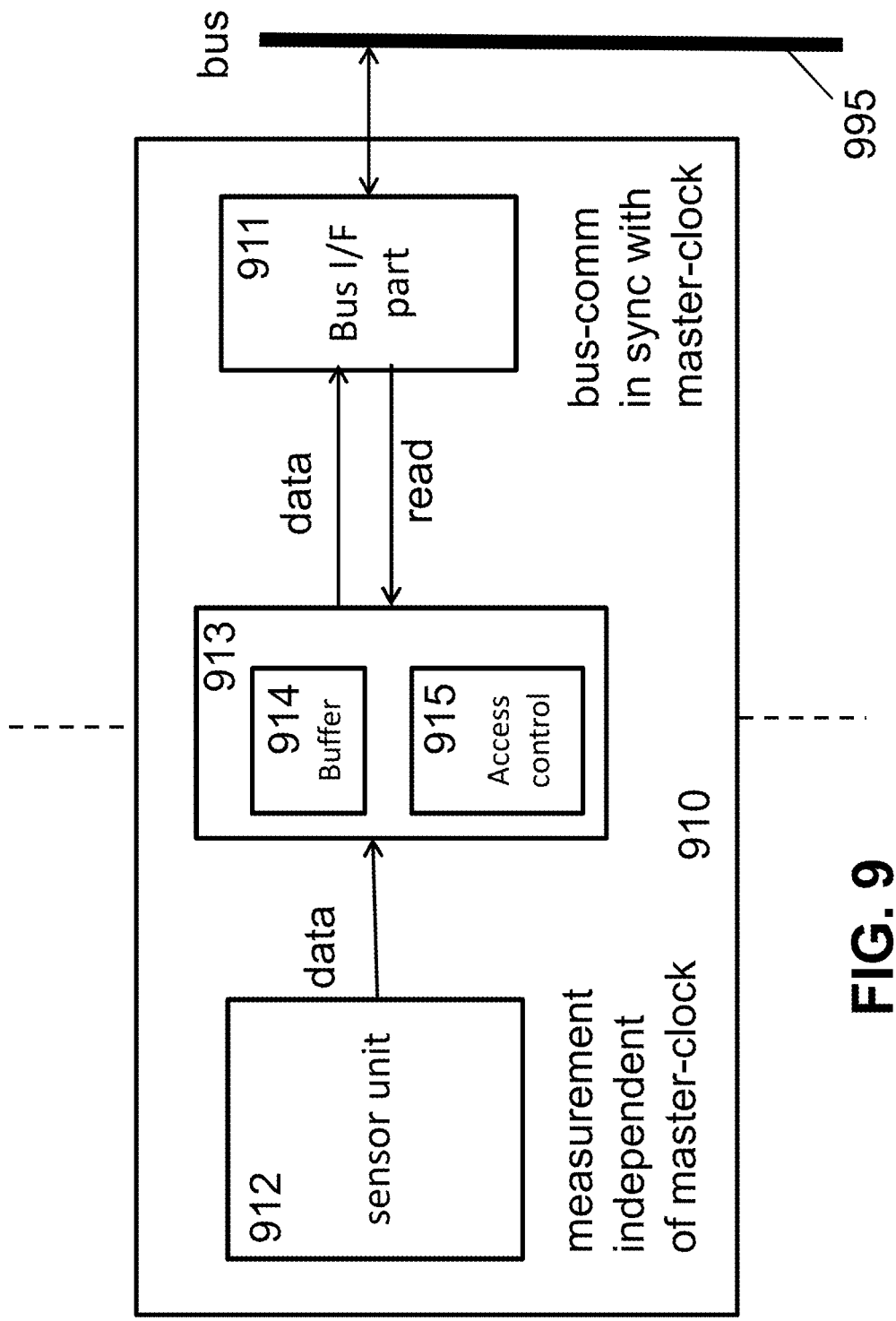
FIG. 9 shows a high-level block diagram of a sensor device according to an embodiment of the present invention, as can be used in the system of FIG. 4.

FIG. 9 shows a high-level block diagram of a sensor device 910, as can be used in the system of FIG. 4.

Figure 10:
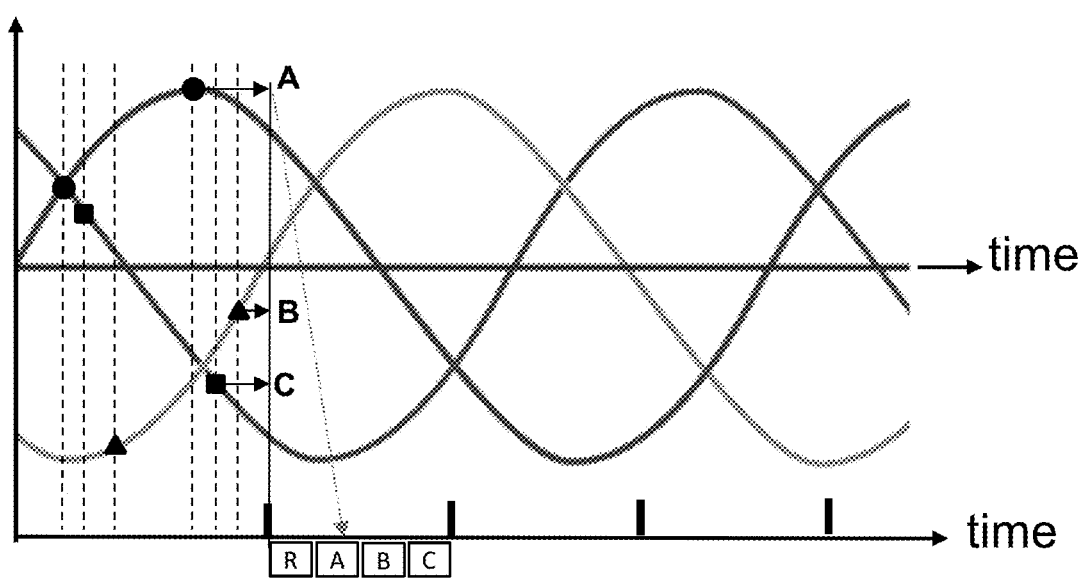
FIG. 10 shows an exemplary waveform (lower half) and a bitstream with a falling edge (upper half) as may be used in combination with the sensor device of FIG. 9, to illustrate how a periodic broadcast read command sent by the master can cause the sensor device to simply provide a most recent measurement value provided by the sensor unit before the arrival of the read command.

FIG. 10 shows an exemplary waveform (lower half) and a bitstream with a falling edge (upper half) as may be used in combination with the sensor device of FIG. 9, to illustrate how a periodic broadcast read command sent by the master can cause the sensor device to simply provide a most recent measurement value provided by the sensor unit before the arrival of the read command.

Figure 11:
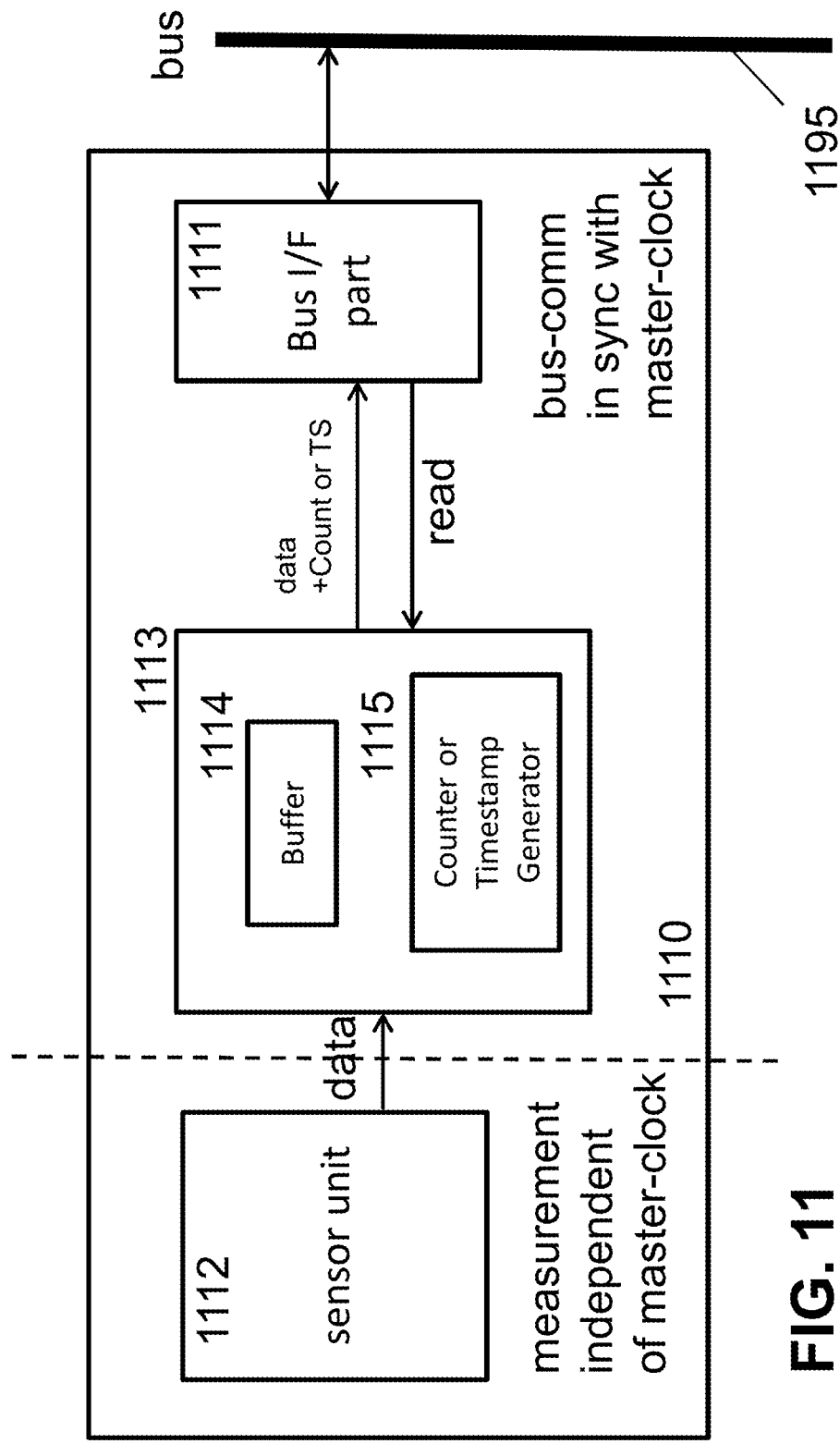
FIG. 11 shows a high-level block diagram of a sensor device according to an embodiment of the present invention, as can be used in the system of FIG. 4, where data provided by the sensor unit is stored in the buffer together with a counter value or a timestamp, and where the sensor device transmits both the data value and the counter or timestamp to the master, upon request.

Jitter between the different values A, B, C obtained from different sensors can be reduced by increasing the frequency at which the sensor unit 912 of each sensor device 910 measures the physical quantity. It is a major advantage of the embodiment shown in FIG. 9 that the readout circuit 913 can be extremely simple. In one embodiment, the readout circuit 913 is mainly based on a dual port RAM FIG. 11 shows a high-level block diagram of a sensor device 1110, as can be used in the system of FIG. 4, where data provided by the sensor unit is stored in a memory or buffer 1114 together with a counter value or a timestamp, and where the sensor device 1110 is adapted for transmitting one or more data value(s) and one or more corresponding counter or timestamps to the master, upon request. The main idea of this embodiment is that the estimation (e.g. interpolation or extrapolation) of the measurement data is not performed inside the sensor units, but is performed by the master.

FIG. 12 is a schematic representation of a block diagram of a communication system 1200, showing a sensor module 1210 (upper part of FIG. 12) and a digital bus 1295 (lower left part of FIG. 12) and a master device 1290 (lower right part of FIG. 12), using two external CAN-FD transceivers 1220, 1292 (not integrated inside the sensor module and the master module). Such devices are commercially available, for example from NXP, and hence need not be explained in more detail here. Suffice it to say that such devices typically have an RXD and TXD line for carrying single-ended signals, for example TTL or CMOS level signals for interconnection with a host, and two bus lines CANH and CANL for the bus. (see also FIG. 21).

FIG. 13 is a variant of the block diagram of FIG. 12, where the CAN transceiver at the sensor side is embedded in the sensor device, e.g. in a multi-die package.

Figure 14:
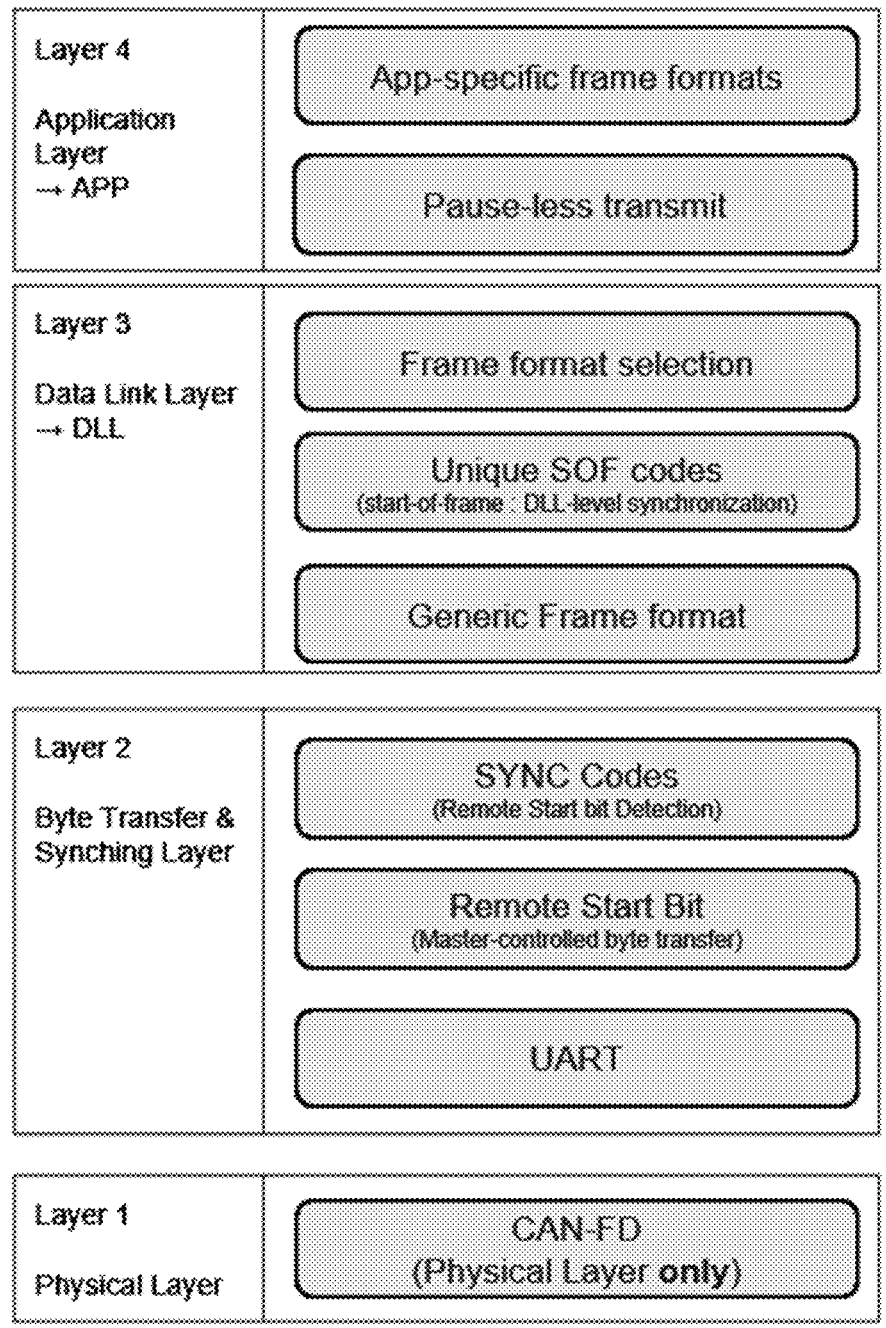
FIG. 14 is a schematic representation of four layers of the "7 layer OSI model", to illustrate several aspects proposed by the present invention, some or all of which may be used in embodiments of the present invention.
Figure 16:
FIG. 16 illustrates an exemplary "frame" as may be used in embodiments of the present invention, each frame comprising one or more "words".
Figure 17:
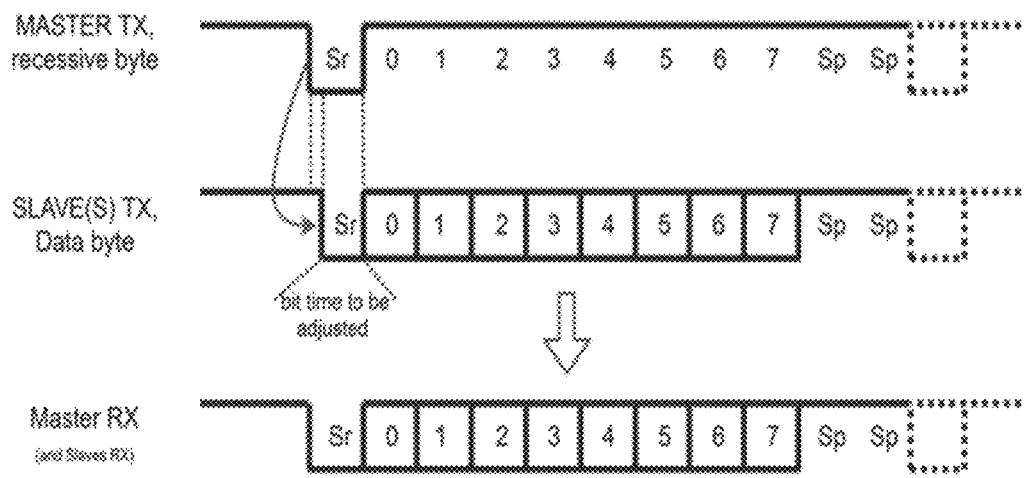
FIG. 17 illustrates how a "word" with a dominant start bit transmitted by the master, is received at a slave device (after a slight delay), and shows how the slave device may correct for the small delay by adjusting the bit time of the start bit.
Figure 18:
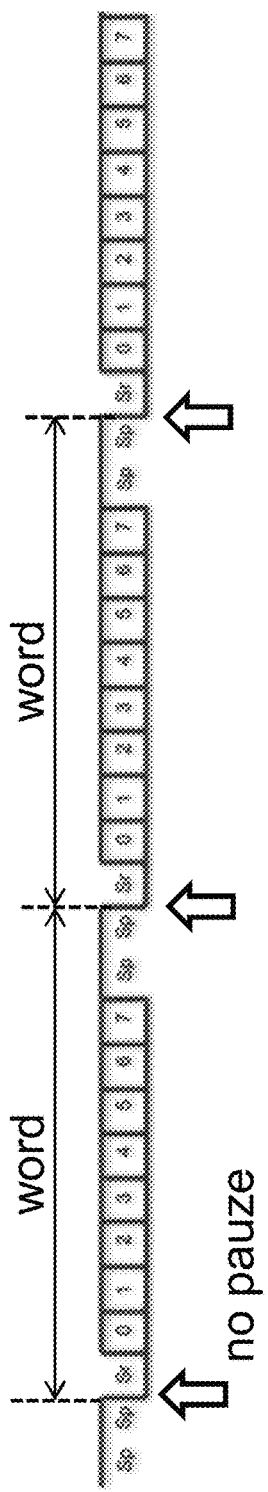
FIG. 18 illustrates a continuous bitstream, without interruption or delay between two words, as is used in embodiments of the present invention.
Figure 19:
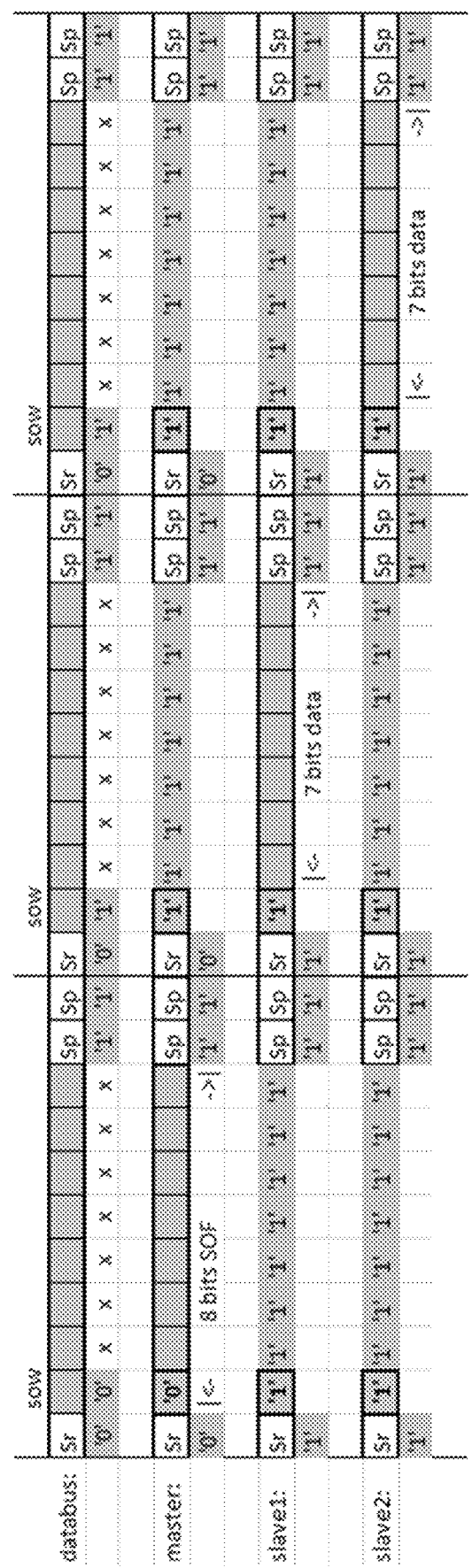
FIG. 19 illustrates a frame structure as can be used in preferred embodiments of the present invention, for allowing easy synchronisation of the slaves to the bitstream.
Figure 26:
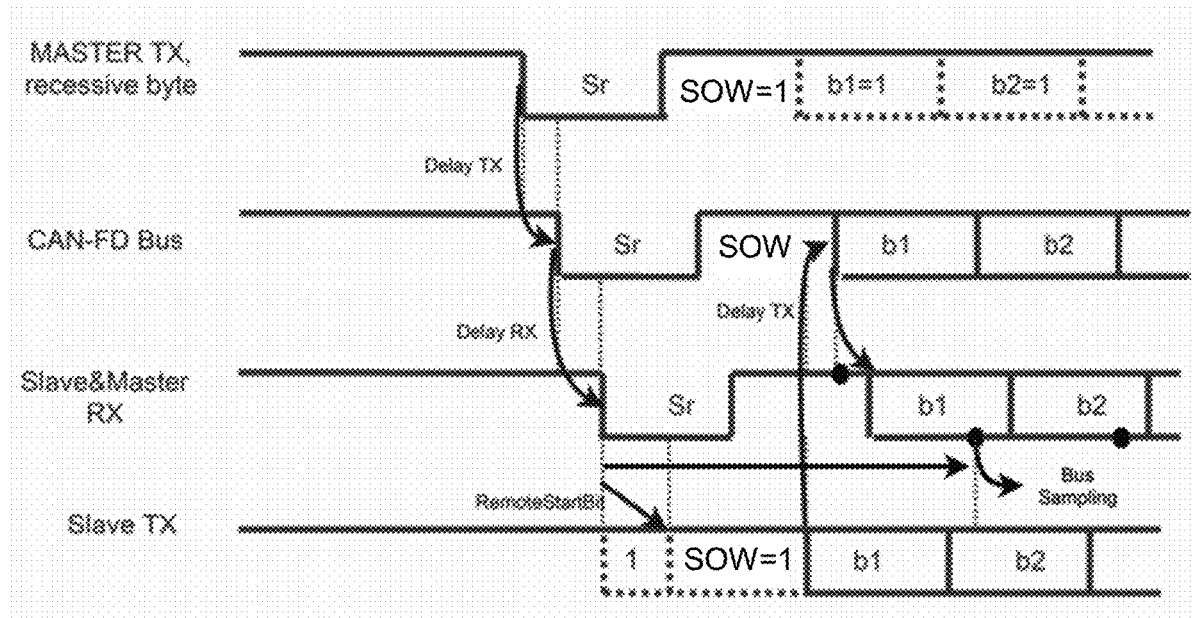

FIG. 14 is a schematic representation of four layers of the "7 layer OSI model", to illustrate several aspects proposed by the present invention, some or all of which may be used in embodiments of the present invention. In particular, a) in preferred embodiments of the present invention, the same voltages and timing are used as specified in the CAN-FD physical layer;

b) a classical UART or USART can be used for serial communication, although in preferred embodiments a minor timing adjustment is proposed, as discussed in more detail in FIG. 17 and FIG. 26;

c) the present invention proposes a principle referred to herein as "remote start bit", as illustrated in FIG. 19, meaning that the master sends a dominant start bit Sr for all the words, whereas the slaves send a non-dominant start bit, in order to synchronize all slave devices to the start-bit Sr of the master;

d) the present invention proposes the use of "sync codes". This is related to synchronization of the slaves after a power-up. Since there is no "pause" between words, the slaves cannot resync by looking to such pauses, but need to sync at word-level by recognizing a unique bit pattern. Such a unique bit-pattern is illustrated in FIGS. 20(*a*) to 20(*c*). Once synchronized at word-level, the slave can sync at frame-level.

e) at the data-link layer, the present invention proposes a generic frame format, illustrated for example in FIG. 16 and FIG. 27, and illustrated by particular examples in FIG. 28 to FIG. 33.

f) the concept of "unique SOF codes", to indicate the start of a frame. With unique is meant that these values cannot occur elsewhere in the data-stream, as may be appreciated from FIG. 19. The SOF codes can for example be selected from a limited list of values comprising one or more of the following values 0xFE, 0xFC, 0xF8, 0xF0, 0xE0, 0xC0, 0x80, 0x00, when expressed with least-significant bit first. Some of these codes can in addition be used by the master to communicate certain commands, for example a general reset of all the slaves. One of these codes may also be used for "future use".

g) the concept of "frame format selection". In some embodiments, the master and the slaves are only configured (e.g. hardcoded) to operate with one particular frame format, while in other embodiments, the master and the slaves may be adapted to selectively operate in one of two modes, modes coded in the master and slave device. For example, in case of an emergency, the master device may decide to change the format (by using another start code) to indicate to the slave devices that for example less words are allocated to each slave device, thereby allowing the slave devices to be read-out faster. Or in case of high EMC disturbance, the master device may instruct the slaves (by using another start code) that more words are allocated to each slave, to include for example a more powerful EDC code (error detection code) or ECC code (error correction code), etc.

h) the concept of "pause-less transmission" or "continuous bitstream" or "concatenated words" all mean that the master is continuously transmitting concatenated words, as illustrated in FIG. 18, without any pause between the words. The main advantage hereof is that the bitstream inherently has a periodic falling edge (see arrows in FIG. 18), and that (as long as the frame format does not change) each slave can send data periodically. In this way, jitter between subsequent values transmitted by each particular sensor is reduced or substantially eliminated.

i) Application specific frame formats are possible, but this aspect falls outside the scope of the present invention.

Figure 15:
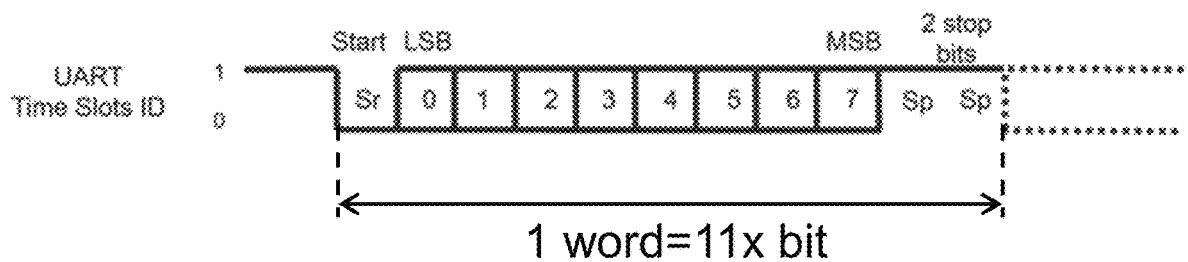
FIG. 15 illustrates an exemplary "word" as can be generated by a classical UART or USART component, the word comprising a plurality of bits, in the example 11 bits.

FIG. 15 illustrates an exemplary "word" as can be used in embodiments of the present invention, and as can be generated by a classical UART or USART component. In preferred embodiments of the present invention: the word comprises 11 bits and contains one start bit Sr='0', there are 8 data-bits d0 to d7, and there are two stop-bits Sp='1'. But it pointed out that the present invention is not limited thereto, and other configurations may also be used, for example 7 or 9 or 10 data-bits, and only one stop-bit. Using two stop bits makes the communication more robust.

FIG. 16 illustrates a sequence of two exemplary frames, the first frame consisting of three words, the second frame consisting of four words, etc.

Each first word of each frame contains a unique code, referred to as SOF (start of frame). In preferred embodiments, this unique code is implemented by choosing a word with the first bit (e.g. lsb bit) equal to '0' (dominant bit), see also FIG. 19. But of course, the invention is not limited hereto, and there are also other possibilities (for example setting two bits to '0').

In the example of FIG. 16, the first frame contains two "further words" (following the word containing the SOF), w1 and w2, which (for example) may both be allocated to a first sensor. The second frame contains three "further words" (following the word containing the SOF), w1, w2 and w3 which (for example) may both be allocated to a second sensor.

The example of FIG. 16 is intended to illustrate allowable frame structures, and to illustrates that the frame structure can dynamically be changed by the master (by choosing a different SOF-code). Of course, the master and the slave devices connected to the bus should know what each SOF-code stands for.

FIG. 17 illustrates how a "word" with a dominant start bit "Sr" transmitted by the master, is received at a slave device (after a slight delay), and shows how the slave device may correct for the small delay by adjusting the bit time of the start bit, in an attempt to better align the data-bits and stop bits Sp transmitted by the master and those sent by the slave.

FIG. 18 illustrates a continuous bitstream, without interruption or delay between two words, as is used in embodiments of the present invention.

FIG. 19 illustrates a frame structure as can be used in preferred embodiments of the present invention, for allowing easy synchronisation of the slaves to the bitstream. What is shown is a frame with a "first word" containing the SOF-code, and two "further words", but the reader will understand that more "further words" will have the same structure.

In preferred embodiments, the master device contains a classical UART or USART which is configured for 11 bits per word, 1 start bit='0' and 2 stop bits='1', and each slave device contains a UART or USART or a slightly modified UART (as will be explained in FIG. 26) which is configured for 11 bits per word, 1 start bit='1' and 2 stop bits='1'. During the first word of the frame of FIG. 19, only the master is allowed to write dominant bits on the bus, hence the slaves must transmit all ones '1'. During the second word of the frame of FIG. 19, the master transmits the start-bit as a dominant but, and only slave 1 is allowed to overwrite data bit d1 to d7, hence the master must transmit all ones except for the start bit, and all other slaves must transmit all ones '1' (or disconnect from the bus or the like). During the third word of the frame of FIG. 19, the master transmits the start-bit as a dominant but, and only slave 2 is allowed to overwrite data bit d1 to d7, hence the master must transmit all ones except for the start bit, and all other slaves must transmit all ones '1' (or disconnect from the bus or the like).

It is pointed out that the scheme of FIG. 19 illustrates a preferred embodiment, but the present invention is not limited thereto, and other variants may also be used. For example, instead of "sacrificing" bit d0 to easily recognize the SOF-codes, and/or to differentiate between words allocated to the master and words allocated to the slaves, it is also possible to use another data-bit for this purpose.

FIGS. 20(a) to 20(c) illustrate by means of an example, how a slave device can get "in sync" with a bitstream after power up. First the slave needs to align with word-boundaries. This is possible for example because each start-of-frame word is also a "sync word", in the sense that these words (the first word of each frame) has the property that the time duration between two falling edges is 11 bit periods. This is only possible for the first word of a frame, as shown in FIG. 20(c), showing that the timer period between two falling edges of other words is at most 9 bit periods.

Figure 21:
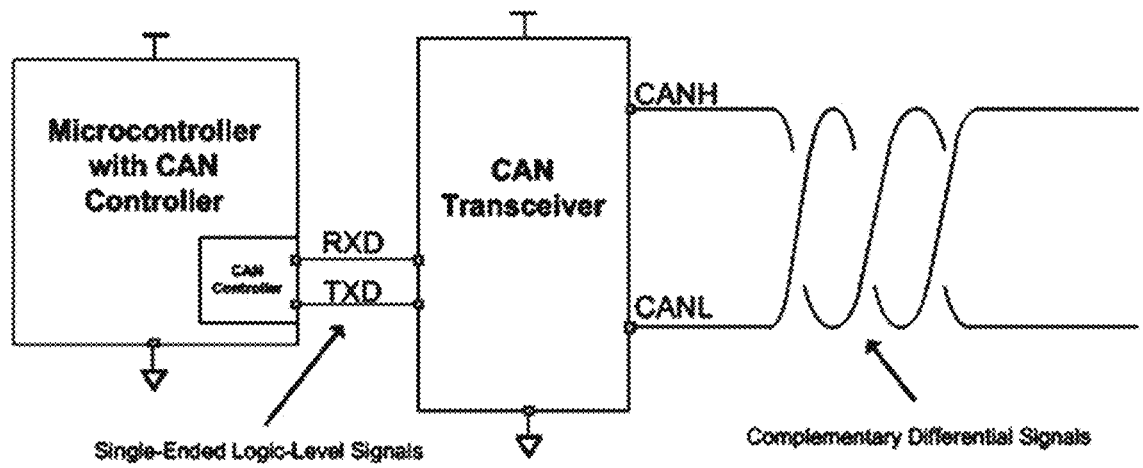
FIG. 21 is an exemplary block diagram to illustrate how a microcontroller with a CAN controller (or a UART) can be connected to a digital bus via an external CAN transceiver.

FIG. 21 is an exemplary block diagram to illustrate how a microcontroller with a CAN controller or a UART can be connected to a digital bus via an external CAN transceiver (commercially available for example from NXP). The bus carries complementary differential signals. Sometimes a four-wire bus is used, in which case a supply voltage line VDD line and a reference voltage (or ground) GND line may be added. It is pointed out however, that the present invention only makes use of the physical layer of the CAN-FD bus, more in particular the voltage levels, not the higher levels.

Figure 22:
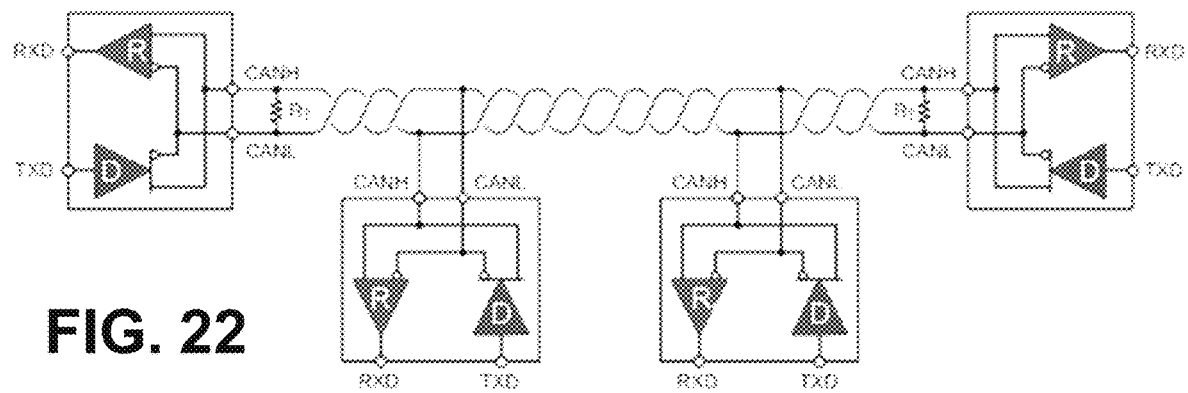
FIG. 22 is a schematic representation to illustrate how four devices can be interconnected to CAN bus.

FIG. 22 is a schematic representation to illustrate how four devices can be interconnected to CAN bus. This is just an example to illustrate that the two lines can be connected to multiple devices, and that the lines should be terminated, but these aspects are well known, and need no further explanation.

Figure 23:
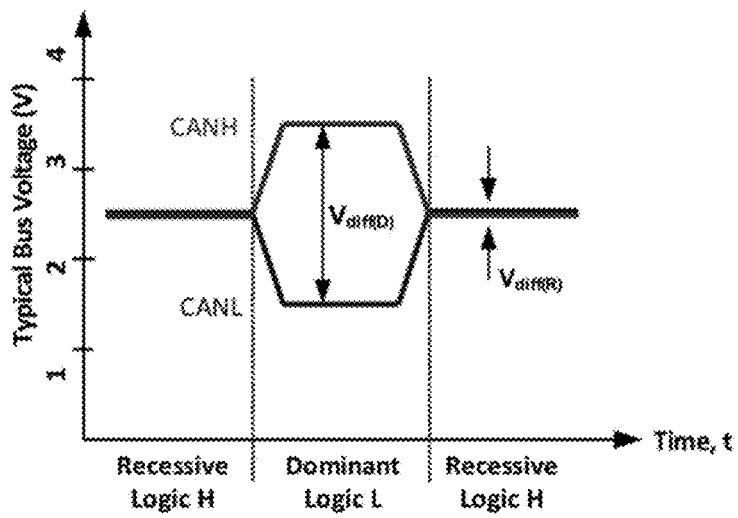
FIG. 23 shows an exemplary waveform using voltage levels in accordance with or compatible with the CAN or CAN-FD physical layer, showing a sequence of one non-dominant bit (also referred to as "recessive bit"), followed by a dominant bit, followed by a non-dominant bit.

FIG. 23 shows an exemplary waveform using voltage levels in accordance with or compatible with the CAN or CAN-FD physical layer, showing a sequence of one non-dominant bit (also referred to as "recessive bit"), followed by a dominant bit, followed by a non-dominant bit.

Figure 24:
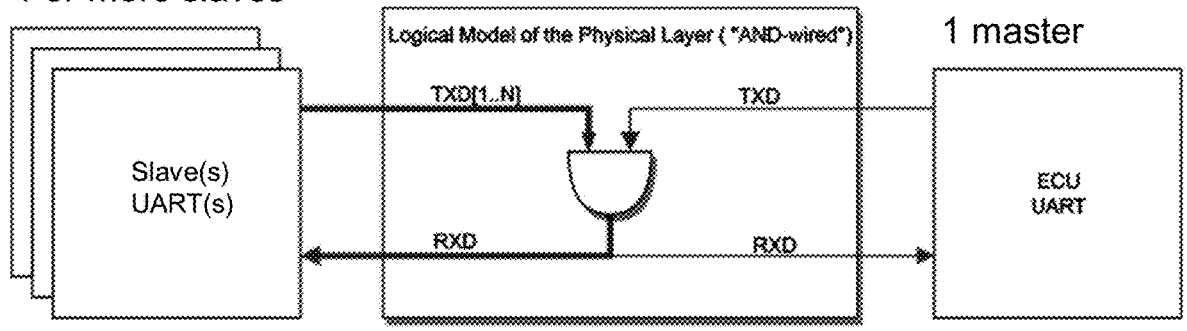
FIG. 24 is a schematic representation of a logical model of the physical layer, as may be used in embodiments of the present invention.

FIG. 24 is a schematic representation of a logical model of the physical layer. This aspect is known per se, for example from I2C bus communication or KNX bus communication. On PCB level the dominant bit typically corresponds to a low-level level, as can be created by a transistor actively pulling the bus low, while a high level is typically created by a pull-up resistor while the transistor output is at high-impedance state.

Figure 25:
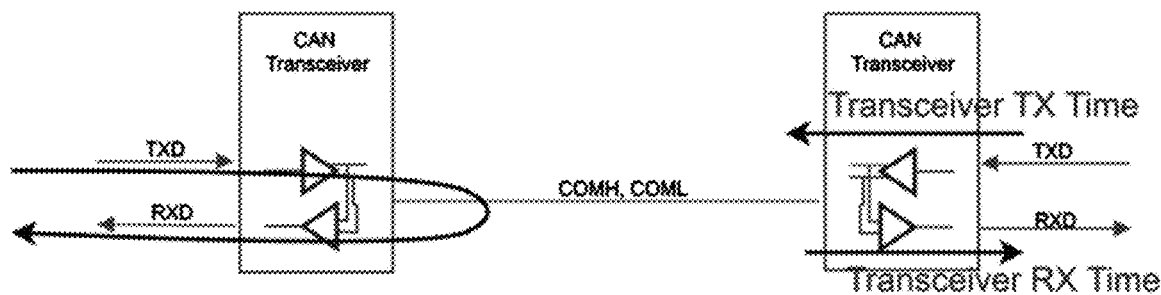
FIG. 25 and FIG. 26 illustrate delays that may occur between the signal transmitted by the master, and the signal transmitted by the slaves, and how this may be compensated in embodiments of the present invention.

FIG. 25 and FIG. 26 illustrate delays that may occur between the signal transmitted by the master, and the signal transmitted by the slaves, and how this may be compensated in embodiments of the present invention. To obtain this behaviour, the slaves may contain a special UART or a special USART having most of the known functionality of classical UARTs or USARTs, except that they can be configured to reduce the timing of the start-bit. Alternatively, the slaves also contain a classical UART or USART, but comprise additionally circuitry to obtaining the same effect. (for example, using a programmable counter).

FIG. 27 shows the same information as FIG. 16.

FIG. 28 shows an exemplary frame format with 9 words per frame, as may be used in communication systems with one master and two slaves or sensor devices, which are read periodically, and where each sensor device can send 4 words per frame.

FIG. 29 shows another exemplary frame format with 5 words per frame, as may be used in communication systems with one master and a single slave or sensor device, which is read periodically, and where the sensor device can send 3 words per frame.

FIG. 30 is another representation of the frame format shown in FIG. 28, where A[i=0 . . . 3] denotes the words allocated to the first slave, and B[i=0 . . . 3] denotes the words allocated to the second slave.

FIG. 31 shows an exemplary bit allocation scheme for a frame structure having three words allocated to one or more slave devices, as may be used in embodiments of the present invention.

FIG. 32 shows another exemplary bit allocation scheme for a frame structure having four words allocated to one or more slave devices, as may be used in embodiments of the present invention.

FIG. 33 shows another exemplary bit allocation scheme for a frame structure having five words allocated to one or more slave devices, as may be used in embodiments of the present invention.

While individual features are explained in different drawings and different embodiments of the present invention, it is contemplated that features of different embodiments can be combined, as would be obvious to the skilled person, when reading this document.

The invention claimed is:

1. A communication system comprising:
   a digital serial bus;
   a master device and at least one slave device operatively connected to said bus in a manner such that each of the master device and the at least one slave device can receive bit signals from the bus, and such that each of the master device and the at least one slave device can send dominant bit signals or non-dominant bit signals to the bus; and
   wherein the master device and the at least one slave device are adapted to communicate over the bus according to a predefined communication protocol;
   wherein the master device is adapted to transmit a continuous bitstream in the form of a plurality of frames, each of the frames comprising one or more words, each word having a constant time duration,
      the first word (SOF) of each frame being a unique word transmitted by the master device that indicates the start of a frame;
      one or more bits (Sr) of each word being transmitted by the master device as a dominant bit that allows the at least one slave device to synchronize to the master device;
      some of the words being transmitted by the master device with a non-dominant bit allows the at least one slave device to overwrite;
   wherein the at least one slave device is adapted to overwrite in the continuous bitstream some of said non-dominant bits such that data is transmitted in a quasi-synchronous manner.

2. A communication system according to claim 1, wherein each bit has a constant time duration.

3. A communication system according to claim 1, wherein each word has at most 10 bits.

4. A communication system according to claim 1, wherein the master device is adapted to transmit said continuous bitstream in the form of a plurality of frames,
   each frame comprising one or more words, including a first word and optionally one or more further words,
   each word comprising a plurality of bits, including a start bit (Sr), a plurality of data-bits (d0-d7) and one or more stop bits (Sp);

the master device transmitting the start bit (Sr) of each word as a dominant bit (logical_0);

the first word of each frame comprising a start-of-frame value (SOF) selected from a limited list of values for identifying the start of each frame (SOF), the start-of-frame value (SOF) having at least one dominant data bit (logical_0) at a predefined data bit position (sow) of said data-bits (d0-d7);

each further word allocated to the at least one slave device transmitted as non-dominant bits (logical_1) that allows the at least one slave device to overwrite some of the bit signals on the bus; and wherein each slave device is adapted to transmit data in further words of the frame allocated to this particular slave device, in a bit-synchronous manner with the bitstream, and such that:

the start bit (Sr) of each further word is transmitted as a non-dominant bit (logical_1);

the data bit at the predefined data bit position (sow) is transmitted as a non-dominant bit (logical_1);

the other data-bits (d1-d7) of each further word contains data values to be transmitted.

5. A communication system according to claim 1, wherein the bus carries analogue signals according to or compatible with one or more of the following options:

the voltage levels of the physical layer standard ISO 11898-1, or the voltage levels of the physical layer standard ISO 11898-2, or the voltage levels of the physical layer standard ISO 11898-3, or TTL voltage levels.

6. A communication system according to claim 1, wherein the predefined data bit position (sow) is the first bit of the data-bits (d0-d7).

7. A communication system according to claim 4, wherein the limited list of values for identifying the start of each frame (SOF) comprises one or more of the following values 0xFE, 0xFC, 0xF8, 0xF0, 0xE0, 0xC0, 0x80, 0x00 when expressed with least-significant bit first.

8. A communication system according to claim 1, wherein the master device comprises a bus-interface adapted to receive data from at least one slave device connected to the bus; and wherein the master device further comprises a processing unit configured to extract the data-bits transmitted by the at least one slave device.

9. A communication system according to claim 1, wherein the slave device comprises a bus-interface (411; 1211; 1311) adapted to transmit data to a master device connected to the bus; and wherein the slave device further comprises a readout unit and/or a processing unit adapted to provide data to the master device upon request.

10. A communication system according to claim 9, wherein the slave device further comprises a sensor unit adapted to measure a physical quantity at moments in time unrelated to a timing of the bus-interface part, and to provide measurement data indicative of the measured physical quantity; and wherein the readout unit and/or the processing unit comprises a memory and/or a buffer for storing the measurement data provided by the sensor unit.

11. A communication system according to claim 10, wherein the sensor unit outputs new measurement data at a frequency in the range from 500 kHz to 2.0 MHz, and wherein jitter between subsequent measurements of a single sensor is less than 2.0 μs or less than 1.0 μs; or wherein the sensor unit outputs new measurement data at a frequency of at least 1.0 MHz, and wherein jitter between subsequent measurements of a single sensor is less than 1.0 μs.

12. A master device for use in a communication system that includes a digital serial bus and at least one slave device operatively connected to the bus such that the master device and the at least one slave device of the communication system can receive bit signals from the bus, and such that the master device and the at least one slave device of the communication system can send dominant bit signals or non-dominant bit signals to the bus, wherein the master device and the at least one slave device are adapted to communicate over the bus according to a predefined communication protocol, wherein the master device is adapted to transmit a continuous bitstream in the form of a plurality of frames, each of the frames comprising one or more words, each word having a constant time duration, the first word (SOF) of each frame being a unique word transmitted by the master device that indicates the start of a frame;

one or more bits (Sr) of each word being transmitted by the master device as a dominant bit that allows the at least one slave device to synchronize to the master device;

some of the words being transmitted by the master device with a non-dominant bit such that the at least one slave device can overwrite in the continuous bitstream some of said non-dominant bits such that data is transmitted in a quasi-synchronous manner.

13. A slave device for use in a communication system that includes a digital serial bus and a master device operatively connected to the bus such that each of the slave device and the master device of the communication system can receive bit signals from the bus, and such that each of the slave device and the master device can send dominant bit signals or non-dominant bit signals to the bus, wherein the master device and the slave device are adapted to communicate over the bus according to a predefined communication protocol, wherein the master device is adapted to transmit a continuous bitstream in the form of a plurality of frames, each of the frames comprising one or more words, each word having a constant time duration, the first word (SOF) of each frame being a unique word transmitted by the master device that indicates the start of a frame;

one or more bits (Sr) of each word being transmitted by the master device as a dominant bit that allows the at least one slave device to synchronize to the master device;

some of the words being transmitted by the master device with a non-dominant bit that allows the at least one slave device to overwrite;

wherein the slave device is adapted to overwrite in the continuous bitstream some of said non-dominant bits such that data is transmitted in a quasi-synchronous manner.

14. A slave device according to claim 13, wherein the slave device further comprises a sensor unit adapted to measure a physical quantity at moments in time and for providing measurement data indicative of the measured physical quantity, wherein the slave device further comprises a processing unit that includes a memory and/or a buffer for storing the measurement data provided by the sensor unit, and wherein the processing unit is adapted to estimate a momentary value of the physical quantity, based on one or more measurement data stored in the memory or the buffer by extrapolating measurement data.

15. A slave device according to claim 13, wherein the slave device further comprises a sensor unit adapted to measure a physical quantity at moments in time and for providing measurement data indicative of the measured physical quantity, wherein the slave device further comprises a processing unit that includes a memory and/or a buffer for storing the measurement data provided by the sensor unit, and wherein the processing unit is adapted to estimate a value that the physical quantity would have at a predefined time period earlier than the moment of arrival of a frame, based on one or more measurement data stored in the memory or the buffer by interpolating measurement data.

16. A slave device according to claim 13, wherein the slave device further comprises a sensor unit adapted to measure a physical quantity at moments in time and for providing measurement data indicative of the measured physical quantity;

wherein the slave device further comprises a processing unit that includes a memory and/or a buffer for storing the measurement data provided by the sensor unit;

wherein the processing unit is adapted to provide data at a higher rate than the actually measured data, and to store this data in said memory or buffer; and wherein the slave device further comprises a readout unit adapted to provide a recently stored value from said memory or from said buffer upon request, or upon arrival of a new frame.

17. A slave device according to claim 13, wherein the slave device further comprises a sensor unit adapted to measure a physical quantity at moments in time and for providing measurement data indicative of the measured physical quantity, wherein the slave device further comprises a processing unit that includes a memory and/or a buffer for storing the measurement data provided by the sensor unit, wherein measurement data provided by the sensor unit is stored in said memory or buffer, and wherein a recently stored value is read from said memory or from said buffer upon request, or upon arrival of a new frame.

18. A slave device according to claim 13, wherein the slave device further comprises a sensor unit adapted to measure a physical quantity at moments in time and for providing measurement data indicative of the measured physical quantity, wherein the slave device further comprises a processing unit that includes a memory and/or a buffer for storing the measurement data provided by the sensor unit, wherein measurement data provided by the sensor unit is stored in said memory or buffer along with a counter value or a timestamp, and wherein both the measurement data and the counter value or timestamp, or a value derived therefrom, is provided to the bus-interface upon request, or upon arrival of a new frame.

* * * * *